US009507857B2

(12) United States Patent
Inaba et al.

(10) Patent No.: US 9,507,857 B2
(45) Date of Patent: Nov. 29, 2016

(54) APPARATUS AND METHOD FOR CLASSIFYING DOCUMENT, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Minato-ku,Tokyo (JP)

(72) Inventors: Masumi Inaba, Tokyo (JP); Toshihiko Manabe, Kanagawa (JP); Tomoharu Kokubu, Kanagawa (JP); Wataru Nakano, Kanagawa (JP)

(73) Assignees: KABUSHIKI KAISHA TOSHIBA, Tokyo (JP); TOSHIBA SOLUTIONS CORPORATION, Tokyo (JP)

( * ) Notice: Subject to any disclaimer, the term of this patent is extended or adjusted under 35 U.S.C. 154(b) by 525 days.

(21) Appl. No.: 13/845,989

(22) Filed: Mar. 18, 2013

(65) Prior Publication Data

US 2013/0268535 A1 Oct. 10, 2013

Related U.S. Application Data

(63) Continuation of application No. PCT/JP2012/066184, filed on Jun. 25, 2012.

(30) Foreign Application Priority Data

Sep. 15, 2011 (JP) .................................. 2011-202281

(51) Int. Cl.
*G06F 17/30* (2006.01)
*G06F 3/048* (2013.01)

(52) U.S. Cl.
CPC ......... *G06F 17/30705* (2013.01); *G06F 3/048* (2013.01); *G06F 17/30707* (2013.01)

(58) Field of Classification Search
CPC .................. G06F 17/30598; G06F 17/30705; G06F 17/30707; G06F 17/3071; G06F 17/30713; G06F 17/30737
See application file for complete search history.

(56) References Cited

U.S. PATENT DOCUMENTS

| 6,009,439 | A | * | 12/1999 | Shiomi | ............... G06F 17/3061 |
| 6,038,557 | A | | 3/2000 | Silverstein | |
| 6,446,061 | B1 | * | 9/2002 | Doerre | ................ G06F 17/3071 707/738 |

(Continued)

FOREIGN PATENT DOCUMENTS

| CN | 101819601 | 9/2010 |
| JP | 11-316768 | 11/1999 |

(Continued)

OTHER PUBLICATIONS

International Search Report for PCT/JP2012/066184 mailed on Sep. 18, 2012.

(Continued)

*Primary Examiner* — Daniel Kinsaul
(74) *Attorney, Agent, or Firm* — Amin, Turocy & Watson LLP

(57) ABSTRACT

According to an embodiment, a document classification apparatus includes an extraction unit, a clustering unit, a classification unit, and a label assignment unit. The extraction unit is configured to extract feature words from documents. The clustering unit is configured to cluster the feature words into clusters so that a difference between the number of documents each including any one of the feature words belonging to one cluster and the number of documents each including any one of the feature words belonging to another cluster is equal to or less than a predetermined reference value. The classification unit is configured to classify the documents into the clusters so that each document belongs to the cluster to which the feature word included in the each document belongs. The label assignment unit is configured to assign a classification label to each cluster as a word representative of the corresponding feature words.

10 Claims, 23 Drawing Sheets

(56) References Cited

U.S. PATENT DOCUMENTS

| | | | | |
|---|---|---|---|---|
| 6,505,195 | B1* | 1/2003 | Ikeda | G06F 17/30707 |
| 6,701,314 | B1* | 3/2004 | Conover | G06F 17/30707 707/740 |
| 8,090,678 | B1* | 1/2012 | Glickman | G06F 17/30705 707/602 |
| 2002/0042793 | A1* | 4/2002 | Choi | G06F 17/30687 |
| 2006/0200341 | A1* | 9/2006 | Corston-Oliver | G06F 17/274 704/5 |
| 2007/0112755 | A1* | 5/2007 | Thompson | G06F 17/3071 |
| 2008/0010274 | A1* | 1/2008 | Carus | G06N 99/005 |
| 2008/0065659 | A1* | 3/2008 | Watanabe et al. | 707/100 |
| 2012/0246162 | A1* | 9/2012 | Yamaguchi | 707/737 |
| 2013/0013612 | A1* | 1/2013 | Fittges | G06F 17/30707 707/739 |

FOREIGN PATENT DOCUMENTS

| | | |
|---|---|---|
| JP | 2003-196298 | 7/2003 |
| JP | 2005-063366 | 3/2005 |
| JP | 2009-251825 | 10/2009 |
| JP | 2009-294939 | 12/2009 |
| JP | 2010-267141 | 11/2010 |
| JP | 2011-053881 | 3/2011 |

OTHER PUBLICATIONS

Written Opinion for PCT/JP2012/066184 mailed on Sep. 18, 2012.
Marti A. Hearst; Clustering Versus Faceted Categories for Information Exploration; Communications of the ACM; Apr. 2006; pp. 59-61; vol. 49-Issue 4.
Chinese Office Action for Chinese Patent Application No. 201280002991.6 mailed on Mar. 14, 2016.
Chinese Office Action for Chinese Patent Application No. 201280002991.6 mailed on Aug. 4, 2015.
Chinese Office Action for Chinese Patent Application No. 201280002991.6 mailed on Aug. 29, 2016.

* cited by examiner

FIG.2

| DOCU-MENT ID | DOCUMENT |
|---|---|
| D1 | I ALWAYS WANT IN NON-SMOKING, AND NO SMOKING AREA IN PIRATES DINING IS WIDE. THE RESERVATION IS NOT WELL MADE, BUT THE EMPLOYEE CHEERFULLY WAITS ON CUSTOMERS. |
| D2 | THE EMPLOYEE RECEIVES CUSTOMERS WITH A SMILE FACE. SERVICE TO CUSTOMERS IS GOOD. IN PARTICULAR, JAPANESE FOOD IS DELICIOUS. THE AMOUNT IS CONSCIENTIOUS. HOWEVER, CALL FOR RESERVATION IS NOT LINED, SO I AM IMPATIENT. |
| D3 | PIRATES DINING IS SMORGASBORD, BUT THERE ARE MANY STAFFS IN THE STORE. |
| D4 | THERE ARE MANY KINDS OF FOODS IN SMORGASBORD, INCLUDING JAPANESE FOOD, CHINESE FOOD, AND WESTERN FOOD. HOWEVER, THE AMOUNT IS REASONABLE. THE STAFF CONTINUOUSLY SUPPLEMENTS THE FOODS. I AM HAPPY BECAUSE THERE IS A SMOKING AREA. |
| D5 | THERE ARE MANY KINDS OF JAPANESE FOOD, CHINESE FOOD, AND WESTERN FOOD, AND AN AMOUNT IS LOWER THAN TROPICAL BUFFET. HOWEVER, INSIDE THE STORE, THE TEMPERATURE OF THE AIR CONDITIONER IS VERY HIGH. |
| D6 | PIRATES DINING IS PLACED IN FRONT OF THE STATION, WHICH IS THE BEST LOCATION, BUT THE CHARGE SETTING IS REASONABLE. THEREFORE, THE GOOD SEAT IS ALWAYS RESERVED. AS THE IMPRESSION, THE MOOD IS GOOD. |
| D7 | THE CHARGE SETTING OF SMORGASBORD IS REASONABLE, BUT IT IS TOO BAD SINCE SEPARATE PARKING FEE IS SPENT. |
| D8 | ALTHOUGH IN FRONT OF THE STATION, I FELT THAT PARKING FEE WAS HIGH. HOWEVER, THE VIEW FROM PIRATES DINING IS BEST. I HAVE A LINGERING IMPRESSION OF THE NICE MOOD. |
| D9 | THERE ARE SMOKING AREA AND NO SMOKING AREA, SO THE DESIRE FOR NO SMOKING IS POSSIBLE. THE RESERVATION IS IMMEDIATELY FULL. |
| D10 | IN SMORGASBORD, THERE ARE JAPANESE FOOD, CHINESE FOOD, AND WESTERN FOOD. I ATE TO EXCESS. I FELT THAT THE TEMPERATURE OF THE AIR CONDITIONER WAS HIGH AT TABLE. |

FIG.3A

| INTENTION REPRESENTATION |
|---|
| NICE |
| GOOD |
| WIDE |
| BAD |
| REGRETTABLE |
| HIGH |

FIG.3B

| TYPE OF INTENTION REPRESENTATION | | INTENTION REPRESENTATION |
|---|---|---|
| FIRST LAYER | SECOND LAYER | |
| EVALUATION | FAVORABLE COMMENT | NICE, GOOD, WIDE, ... |
| | UNFAVORABLE COMMENT | BAD, REGRETTABLE, HIGH, ... |
| YES OR NO | YES | APPROVAL, AGREEMENT, ACCEPTANCE, ... |
| | NO | DENIAL, OPPOSITION, REFUSAL, ... |
| | NONE | WITHDRAWAL, INVALIDATION, ABSENCE, ... |
| SUCCESS OR FAILURE | SUCCESS | COMPLETION, SETTLEMENT, ORDER RECEIVED, ... |
| | FAILURE | INCOMPLETE, UNSETTLED, FAILURE TO RECEIVE ORDER, ... |

FIG.4
(a)
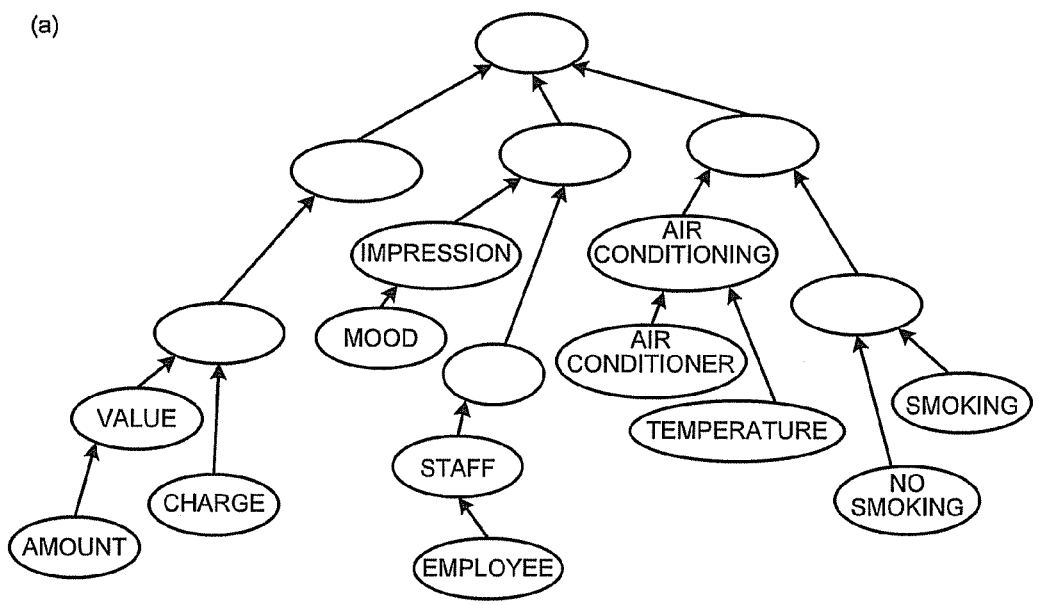
(b)
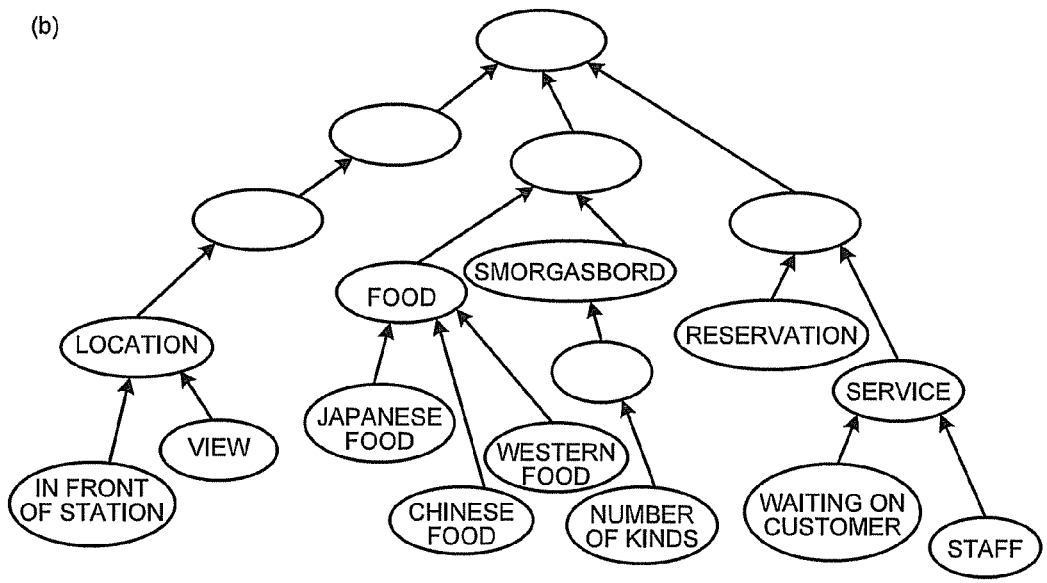

FIG.5A

| DOCUMENT ID | FEATURE WORD |
|---|---|
| D1 | NO SMOKING AREA, NO SMOKING, AREA, WAITING ON CUSTOMER, RESERVATION |
| D2 | EMPLOYEE, WAITING ON CUSTOMER, JAPANESE FOOD, AMOUNT, RESERVATION |
| D3 | STAFF |
| D4 | NUMBER OF KINDS, AMOUNT, STAFF, SMOKING SECTION, SMOKING, SEAT |
| D5 | NUMBER OF KINDS, AMOUNT, TEMPERATURE |
| D6 | IN FRONT OF STATION, CHARGE SETTING, CHARGE, SETTING, VIEW, MOOD, RESERVATION |
| D7 | CHARGE SETTING, CHARGE, SETTING, PARKING FEE, PARKING, FEE |
| D8 | VIEW, MOOD, PARKING FEE, PARKING, FEE |
| D9 | DESIRE FOR NO SMOKING, NO SMOKING, DESIRE, RESERVATION |
| D10 | TEMPERATURE |

FIG.5B

| DOCUMENT ID | FEATURE WORD |
|---|---|
| D1 | FAVORABLE COMMENT: NO SMOKING AREA, NO SMOKING, AREA, WAITING ON CUSTOMER<br>UNFAVORABLE COMMENT: RESERVATION |
| D2 | FAVORABLE COMMENT: EMPLOYEE, WAITING ON CUSTOMER, JAPANESE FOOD, AMOUNT<br>UNFAVORABLE COMMENT: RESERVATION |
| D3 | FAVORABLE COMMENT: STAFF |
| D4 | FAVORABLE COMMENT: NUMBER OF KINDS, AMOUNT, STAFF, SMOKING SECTION, SMOKING, SEAT |
| D5 | FAVORABLE COMMENT: NUMBER OF KINDS, AMOUNT<br>UNFAVORABLE COMMENT: TEMPERATURE |
| D6 | FAVORABLE COMMENT: IN FRONT OF STATION, CHARGE SETTING, CHARGE, SETTING, VIEW, MOOD<br>UNFAVORABLE COMMENT: RESERVATION |
| D7 | FAVORABLE COMMENT: CHARGE SETTING, CHARGE, SETTING<br>UNFAVORABLE COMMENT: PARKING FEE, PARKING, FEE |
| D8 | FAVORABLE COMMENT: VIEW, MOOD<br>UNFAVORABLE COMMENT: PARKING FEE, PARKING, FEE |
| D9 | FAVORABLE COMMENT:<br>DESIRE FOR NO SMOKING, NO SMOKING, DESIRE<br>UNFAVORABLE COMMENT: RESERVATION |
| D10 | UNFAVORABLE COMMENT: TEMPERATURE |

FIG.7A

| DOCUMENT CLUSTER ID | FEATURE WORD | DOCUMENT ID |
|---|---|---|
| C1 | EMPLOYEE, STAFF, WAITING ON CUSTOMER, RESERVATION | D1, D2, D3, D4, D6, D9 |
| C2 | AMOUNT, CHARGE, CHARGE SETTING, PARKING FEE | D2, D4, D5, D6, D7, D8 |
| C3 | SMORGASBORD, JAPANESE FOOD, CHINESE FOOD, NUMBER OF KINDS, WESTERN FOOD | D2, D3, D4, D5, D7, D10 |
| C4 | SMOKING, NO SMOKING, NO SMOKING AREA, DESIRE FOR NO SMOKING | D1, D4, D9 |
| C5 | IN FRONT OF STATION, VIEW, IMPRESSION, MOOD, AIR CONDITIONER, TEMPERATURE | D5, D6, D8, D10 |

FIG.7B

| DOCUMENT CLUSTER ID | FEATURE WORD | DOCUMENT ID |
|---|---|---|
| C1 | FAVORABLE COMMENT: EMPLOYEE, STAFF, WAITING ON CUSTOMER | D1, D2, D3, D4 |
| C1 | UNFAVORABLE COMMENT: RESERVATION | D1, D2, D6, D9 |
| C2 | FAVORABLE COMMENT: AMOUNT, CHARGE, CHARGE SETTING | D2, D4, D5, D6 |
| C2 | UNFAVORABLE COMMENT: PARKING FEE | D7, D8 |
| C3 | FAVORABLE COMMENT: SMORGASBORD, JAPANESE FOOD, CHINESE FOOD, NUMBER OF KINDS, WESTERN FOOD | D2, D3, D4, D5, D7, D10 |
| C4 | FAVORABLE COMMENT: SMOKING, NO SMOKING, NO SMOKING AREA, DESIRE FOR NO SMOKING | D1, D4, D9 |
| C5 | FAVORABLE COMMENT: IN FRONT OF STATION, VIEW, IMPRESSION, MOOD | D6, D8 |
| C5 | UNFAVORABLE COMMENT: AIR CONDITIONER, TEMPERATURE | D5, D10 |

FIG.8A

| DOCUMENT CLUSTER ID | CLASSIFICATION LABEL | FEATURE WORD | DOCUMENT ID |
|---|---|---|---|
| C1 | RESERVATION, SERVICE | EMPLOYEE, STAFF, WAITING ON CUSTOMER, RESERVATION | D1, D2, D3, D4, D6, D9 |
| C2 | CHARGE, VALUE | AMOUNT, CHARGE, CHARGE SETTING, PARKING FEE | D2, D4, D5, D6, D7, D8 |
| C3 | SMORGASBORD, FOOD | SMORGASBORD, JAPANESE FOOD, CHINESE FOOD, NUMBER OF KINDS, WESTERN FOOD | D2, D3, D4, D5, D7, D10 |
| C4 | NO SMOKING | SMOKING, NO SMOKING, NO SMOKING AREA, DESIRE FOR NO SMOKING | D1, D4, D9 |
| C5 | OTHERS, LOCATION, IMPRESSION, AIR CONDITIONING | IN FRONT OF STATION, VIEW, IMPRESSION, MOOD, AIR CONDITIONER, TEMPERATURE | D5, D6, D8, D10 |

FIG.8B

| DOCUMENT CLUSTER ID | CLASSIFICATION LABEL | FEATURE WORD | DOCUMENT ID |
|---|---|---|---|
| C1 | RESERVATION, SERVICE | FAVORABLE COMMENT: EMPLOYEE, STAFF, WAITING ON CUSTOMER | D1, D2, D3, D4 |
| C1 | RESERVATION, SERVICE | UNFAVORABLE COMMENT: RESERVATION | D1, D2, D6, D9 |
| C2 | CHARGE, VALUE | FAVORABLE COMMENT: AMOUNT, CHARGE, CHARGE SETTING | D2, D4, D5, D6 |
| C2 | CHARGE, VALUE | UNFAVORABLE COMMENT: PARKING FEE | D7, D8 |
| C3 | SMORGASBORD, FOOD | FAVORABLE COMMENT: SMORGASBORD, JAPANESE FOOD, CHINESE FOOD, NUMBER OF KINDS, WESTERN FOOD | D2, D3, D4, D5, D7, D10 |
| C4 | NO SMOKING | FAVORABLE COMMENT: SMOKING, NO SMOKING, NO SMOKING AREA, DESIRE FOR NO SMOKING | D1, D4, D9 |
| C5 | OTHERS, LOCATION, IMPRESSION, AIR CONDITIONING | FAVORABLE COMMENT: IN FRONT OF STATION, VIEW, IMPRESSION, MOOD | D6, D8 |
| C5 | OTHERS, LOCATION, IMPRESSION, AIR CONDITIONING | UNFAVORABLE COMMENT: AIR CONDITIONER, TEMPERATURE | D5, D10 |

FIG.9A

| | |
|---|---|
| RESERVATION, SERVICE 📄 (6) | *RESERVATION*, EMPLOYEE, STAFF, WAITING ON CUSTOMER |
| CHARGE, VALUE 📄 (6) | AMOUNT, CHARGE, *PARKING FEE*, CHARGE SETTING |
| SMORGASBORD, FOOD 📄 (6) | SMORGASBORD, JAPANESE FOOD, CHINESE FOOD, NUMBER OF KINDS, WESTERN FOOD |
| NO SMOKING 📄 (3) | SMOKING, NO SMOKING, NO SMOKING AREA, DESIRE FOR NO SMOKING |
| OTHERS, LOCATION, IMPRESSION, AIR CONDITIONING 📄 (4) | IN FRONT OF STATION, VIEW, IMPRESSION, MOOD, *AIR CONDITIONER, TEMPERATURE* |

FIG.9B

| | |
|---|---|
| RESERVATION, SERVICE 📄 (6) | ☺ EMPLOYEE, STAFF, WAITING ON CUSTOMER<br>☹ RESERVATION |
| CHARGE, VALUE 📄 (6) | ☺ AMOUNT, CHARGE, CHARGE SETTING<br>☹ PARKING FEE |
| SMORGASBORD, FOOD 📄 (6) | ☺ SMORGASBORD, JAPANESE FOOD, CHINESE FOOD, NUMBER OF KINDS, WESTERN FOOD |
| NO SMOKING 📄 (3) | ☺ SMOKING, NO SMOKING, NO SMOKING AREA, DESIRE FOR NO SMOKING |
| OTHERS, LOCATION, IMPRESSION, AIR CONDITIONING 📄 (4) | ☺ IN FRONT OF STATION, VIEW, IMPRESSION, MOOD<br>☹ AIR CONDITIONER, TEMPERATURE |

FIG.9C

☺
| | |
|---|---|
| RESERVATION, SERVICE 📄 (4) | EMPLOYEE, STAFF, WAITING ON CUSTOMER |
| CHARGE, VALUE 📄 (4) | AMOUNT, CHARGE, CHARGE SETTING |
| SMORGASBORD, FOOD 📄 (6) | SMORGASBORD, JAPANESE FOOD, CHINESE FOOD, NUMBER OF KINDS, WESTERN FOOD |
| NO SMOKING 📄 (3) | SMOKING, NO SMOKING, NO SMOKING AREA, DESIRE FOR NO SMOKING |
| OTHERS, LOCATION, IMPRESSION, AIR CONDITIONING 📄 (2) | IN FRONT OF STATION, VIEW, IMPRESSION, MOOD |

☹
| | |
|---|---|
| RESERVATION, SERVICE 📄 (4) | RESERVATION |
| CHARGE, VALUE 📄 (2) | PARKING FEE |
| OTHERS, LOCATION, IMPRESSION, AIR CONDITIONING 📄 (2) | AIR CONDITIONER, TEMPERATURE |

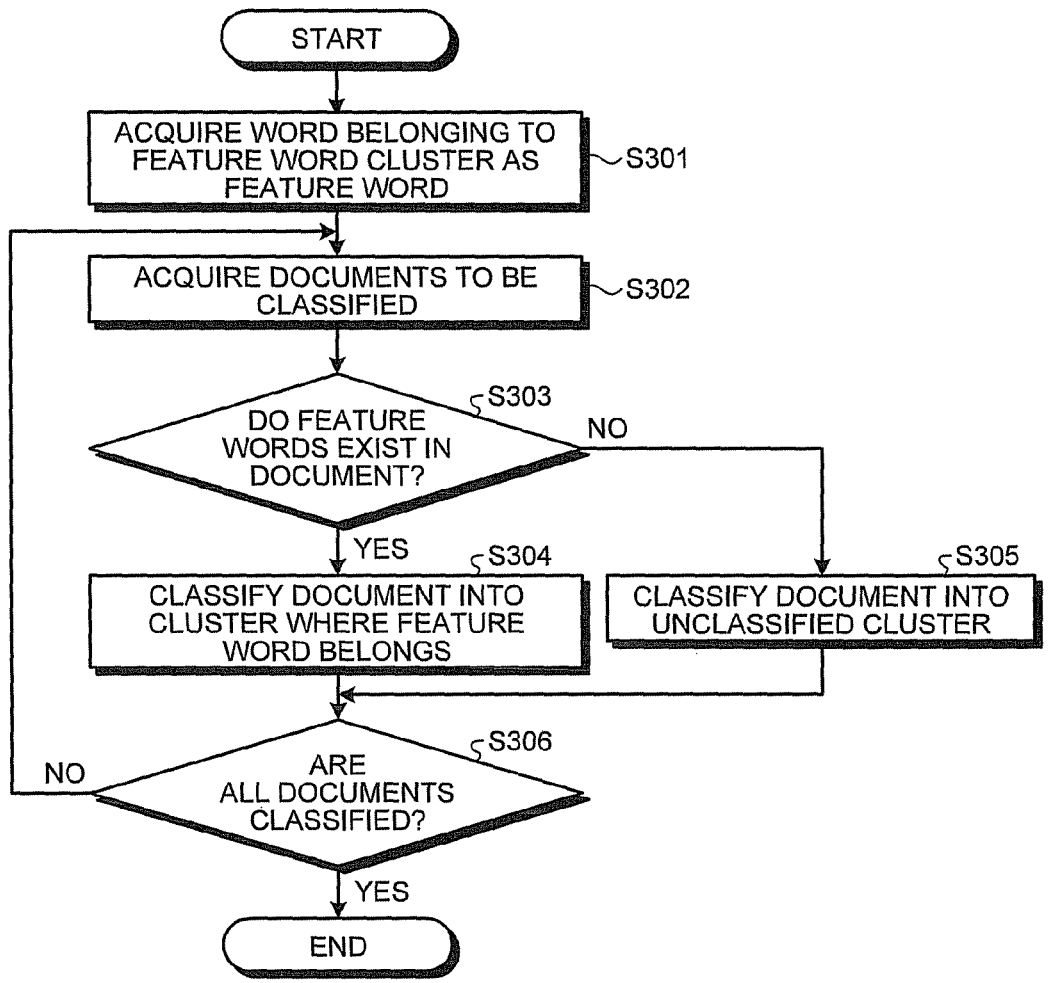

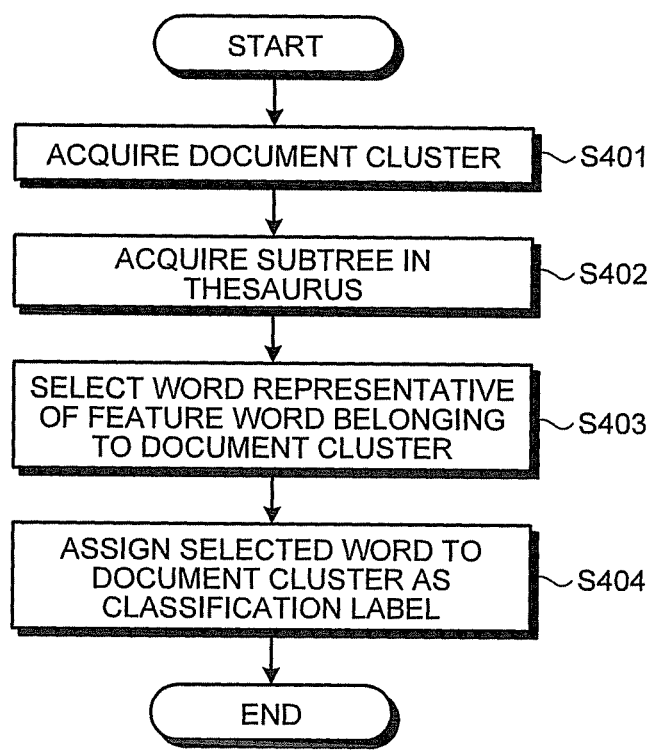

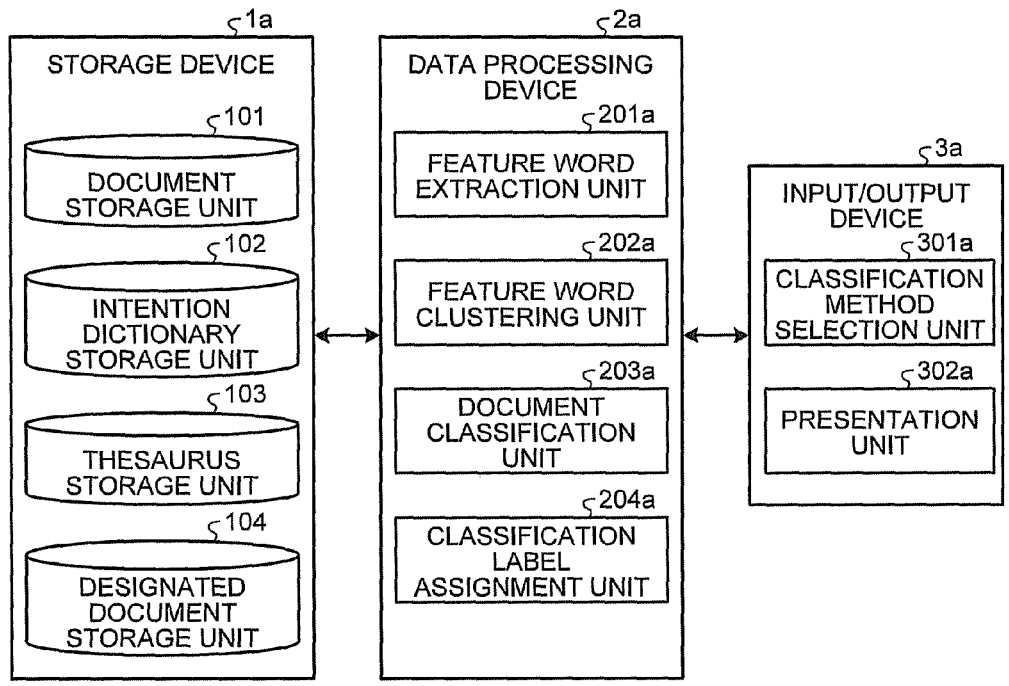

| DESIGNATED DOCUMENT ID | DESIGNATED DOCUMENT |
|---|---|
| N1 | <PIRATES DINING, EXPANSION OF NO SMOKING AREA><br>IN PIRATES DINING, NO SMOKING AREA HAS BEEN EXPANDED SINCE FEBRUARY 2011.<br>... |
| N2 | <TROPICAL BUFFET, RENEWAL OPEN WITH INSTALLATION OF NO SMOKING AREA><br>TROPICAL BUFFET, FOOD SERVICE CHAIN, RENEWAL OPEN WITH INSTALLATION OF NO SMOKING AREA ON JANUARY 2011. TROPICAL BUFFET IS A RESTAURANT OF SMORGASBORD STYLE, FOCUSING ON ASIAN FOODS, AND REPRODUCES OVERSEAS FAVORITE MENUS.<br>... |

FIG.16

| DOCUMENT ID | FEATURE WORD | |
|---|---|---|
| D1 | FAVORABLE COMMENT: NO SMOKING AREA, NO SMOKING, AREA, WAITING ON CUSTOMER UNFAVORABLE COMMENT: RESERVATION | DESIGNATED DOCUMENT: PIRATES DINING, NO SMOKING AREA |
| D2 | FAVORABLE COMMENT: EMPLOYEE, WAITING ON CUSTOMER, JAPANESE FOOD, AMOUNT UNFAVORABLE COMMENT: TEMPERATURE | |
| D3 | FAVORABLE COMMENT: STAFF | DESIGNATED DOCUMENT: PIRATES DINING |
| D4 | FAVORABLE COMMENT: NUMBER OF KINDS, AMOUNT, STAFF, SMOKING SECTION, SMOKING, SEAT | |
| D5 | FAVORABLE COMMENT: NUMBER OF KINDS, AMOUNT UNFAVORABLE COMMENT: TEMPERATURE | DESIGNATED DOCUMENT: TROPICAL BUFFET |
| D6 | FAVORABLE COMMENT: IN FRONT OF STATION, CHARGE SETTING, CHARGE, SETTING, VIEW, MOOD UNFAVORABLE COMMENT: RESERVATION | DESIGNATED DOCUMENT: PIRATES DINING |
| D7 | FAVORABLE COMMENT: CHARGE SETTING, CHARGE, SETTING UNFAVORABLE COMMENT: PARKING FEE, PARKING, FEE | |
| D8 | FAVORABLE COMMENT: VIEW, MOOD UNFAVORABLE COMMENT: PARKING FEE, PARKING, FEE | DESIGNATED DOCUMENT: PIRATES DINING |
| D9 | FAVORABLE COMMENT: DESIRE FOR NO SMOKING, NO SMOKING, DESIRE UNFAVORABLE COMMENT: RESERVATION | |
| D10 | UNFAVORABLE COMMENT: TEMPERATURE | |

FIG.17

| DOCUMENT CLUSTER ID | CLASSIFICATION LABEL | FEATURE WORD | DOCUMENT ID |
|---|---|---|---|
| C1 | RESERVATION, SERVICE | FAVORABLE COMMENT: RESERVATION, EMPLOYEE, STAFF, WAITING ON CUSTOMER | D1, D2, D3, D4, D6, D9 |
| C2 | CHARGE, VALUE | FAVORABLE COMMENT: AMOUNT, CHARGE, CHARGE SETTING | D2, D4, D5, D6 |
| | | UNFAVORABLE COMMENT: PARKING FEE | D7, D8 |
| C3 | SMORGASBORD, FOOD | FAVORABLE COMMENT: SMORGASBORD, JAPANESE FOOD, CHINESE FOOD, NUMBER OF KINDS, WESTERN FOOD | D2, D3, D4, D5, D7, D10 |
| C4 | NO SMOKING | FAVORABLE COMMENT: SMOKING, NO SMOKING, NO SMOKING AREA, DESIRE FOR NO SMOKING DESIGNATED DOCUMENT: NO SMOKING AREA | D1, D4, D9 |
| C5 | OTHERS, LOCATION, IMPRESSION, AIR CONDITIONING | FAVORABLE COMMENT: IN FRONT OF STATION, VIEW, IMPRESSION, MOOD | D6, D8 |
| | | UNFAVORABLE COMMENT: AIR CONDITIONER, TEMPERATURE | D5, D10 |
| C6 | PIRATES DINING | DESIGNATED DOCUMENT: PIRATES DINING | D1, D3, D6, D8 |
| C7 | TROPICAL BUFFET | DESIGNATED DOCUMENT: TROPICAL BUFFET | D5 |

FIG.18A

| | |
|---|---|
| RESERVATION, SERVICE (6) | *RESERVATION*, EMPLOYEE, STAFF, WAITING ON CUSTOMER |
| CHARGE, VALUE (6) | AMOUNT, CHARGE, *PARKING FEE*, CHARGE SETTING |
| SMORGASBORD, FOOD (6) | SMORGASBORD, JAPANESE FOOD, CHINESE FOOD, NUMBER OF KINDS, WESTERN FOOD |
| 🚩NO SMOKING (3) | SMOKING, NO SMOKING, NO SMOKING AREA, DESIRE FOR NO SMOKING |
| OTHERS, LOCATION, IMPRESSION, AIR CONDITIONING (4) | IN FRONT OF STATION, VIEW, IMPRESSION, MOOD, *AIR CONDITIONER*, *TEMPERATURE* |
| 🚩PIRATES DINING (4) | PIRATES DINING |
| 🚩TROPICAL BUFFET (1) | TROPICAL BUFFET |

FIG.18B

| | |
|---|---|
| 🚩PIRATES DINING (4) | PIRATES DINING |
| 🚩NO SMOKING (3) | SMOKING, NO SMOKING, NO SMOKING AREA, DESIRE FOR NO SMOKING |
| 🚩TROPICAL BUFFET (1) | TROPICAL BUFFET |
| RESERVATION, SERVICE (6) | *RESERVATION*, EMPLOYEE, STAFF, WAITING ON CUSTOMER |
| CHARGE, VALUE (6) | AMOUNT, CHARGE, *PARKING FEE*, CHARGE SETTING |
| SMORGASBORD, FOOD (6) | SMORGASBORD, JAPANESE FOOD, CHINESE FOOD, NUMBER OF KINDS, WESTERN FOOD |
| OTHERS, LOCATION, IMPRESSION, AIR CONDITIONING (4) | IN FRONT OF STATION, VIEW, IMPRESSION, MOOD, *AIR CONDITIONER*, *TEMPERATURE* |

| TYPE OF VIEWPOINT REPRESENTATION | VIEWPOINT REPRESENTATION |
|---|---|
| CHARGE | CHARGE, VALUE, PRICE, ... |
| SERVICE | SERVICE, EMPLOYEE, WAITING ON CUSTOMER, ... |
| LOCATION | LOCATION, IN FRONT OF STATION, NEAR STATION, ... |

FIG.21

| DOCUMENT ID | FEATURE WORD | |
|---|---|---|
| D1 | FAVORABLE COMMENT: NO SMOKING AREA, NO SMOKING, AREA, WAITING ON CUSTOMER UNFAVORABLE COMMENT: RESERVATION | SERVICE: WAITING ON CUSTOMER |
| D2 | FAVORABLE COMMENT: EMPLOYEE, WAITING ON CUSTOMER, JAPANESE FOOD, AMOUNT UNFAVORABLE COMMENT: RESERVATION | SERVICE: EMPLOYEE, WAITING ON CUSTOMER |
| D3 | FAVORABLE COMMENT: STAFF | |
| D4 | FAVORABLE COMMENT: NUMBER OF KINDS, AMOUNT, STAFF, SMOKING SECTION, SMOKING, SEAT | |
| D5 | FAVORABLE COMMENT: NUMBER OF KINDS, AMOUNT UNFAVORABLE COMMENT: TEMPERATURE | |
| D6 | FAVORABLE COMMENT: IN FRONT OF STATION, CHARGE SETTING, CHARGE, SETTING, VIEW, MOOD UNFAVORABLE COMMENT: RESERVATION | CHARGE: CHARGE LOCATION: IN FRONT OF STATION |
| D7 | FAVORABLE COMMENT: CHARGE SETTING, CHARGE, SETTING UNFAVORABLE COMMENT: PARKING FEE, PARKING, FEE | CHARGE: CHARGE |
| D8 | FAVORABLE COMMENT: VIEW, MOOD UNFAVORABLE COMMENT: PARKING FEE, PARKING, FEE | CHARGE: CHARGE |
| D9 | FAVORABLE COMMENT: DESIRE FOR NO SMOKING, NO SMOKING, DESIRE UNFAVORABLE COMMENT: RESERVATION | |
| D10 | UNFAVORABLE COMMENT: TEMPERATURE | |

FIG.22

| DOCUMENT CLUSTER ID | CLASSIFICATION LABEL | FEATURE WORD | DOCUMENT ID |
|---|---|---|---|
| C1 | RESERVATION, SERVICE | FAVORABLE COMMENT: RESERVATION, EMPLOYEE, STAFF, WAITING ON CUSTOMER SERVICE: EMPLOYEE, WAITING ON CUSTOMER | D1, D2, D3, D4, D6, D9 |
| C2 | CHARGE, VALUE | FAVORABLE COMMENT: AMOUNT, CHARGE, CHARGE SETTING CHARGE: CHARGE | D2, D4, D5, D6 |
| | | UNFAVORABLE COMMENT: PARKING FEE | D7, D8 |
| C3 | SMORGASBORD, FOOD | FAVORABLE COMMENT: SMORGASBORD, JAPANESE FOOD, CHINESE FOOD, NUMBER OF KINDS, WESTERN FOOD | D2, D3, D4, D5, D7, D10 |
| C4 | NO SMOKING | FAVORABLE COMMENT: SMOKING, NO SMOKING, NO SMOKING AREA, DESIRE FOR NO SMOKING | D1, D4, D9 |
| C5 | OTHERS, LOCATION, IMPRESSION, AIR CONDITIONING | FAVORABLE COMMENT: IN FRONT OF STATION, VIEW, IMPRESSION, MOOD LOCATION: IN FRONT OF STATION | D6, D8 |
| | | UNFAVORABLE COMMENT: AIR CONDITIONER, TEMPERATURE | D5, D10 |

FIG.23A

```
⚡RESERVATION, SERVICE 📄 (6) ——— RESERVATION, EMPLOYEE, STAFF,
                                  WAITING ON CUSTOMER
⚡CHARGE, VALUE 📄 (6) ——————— AMOUNT, CHARGE, PARKING FEE, CHARGE
                                  SETTING
  SMORGASBORD, FOOD 📄 (6) ——— SMORGASBORD, JAPANESE FOOD, CHINESE
                                  FOOD, NUMBER OF KINDS, WESTERN FOOD
  NO SMOKING 📄 (3) ——————————— SMOKING, NO SMOKING, NO SMOKING
                                  AREA, DESIRE FOR NO SMOKING
⚡OTHERS, LOCATION,           📄(4)— IN FRONT OF STATION, VIEW, IMPRESSION,
  IMPRESSION, AIR CONDITIONING     MOOD, AIR CONDITIONER, TEMPERATURE
```

FIG.23B

```
⚡RESERVATION, SERVICE 📄 (6) ——— RESERVATION, EMPLOYEE, STAFF,
                                  WAITING ON CUSTOMER
⚡CHARGE, VALUE 📄 (6) ——————— AMOUNT, CHARGE, PARKING FEE, CHARGE
                                  SETTING
⚡OTHERS, LOCATION,           📄(4)— IN FRONT OF STATION, VIEW, IMPRESSION,
  IMPRESSION, AIR CONDITIONING     MOOD, AIR CONDITIONER, TEMPERATURE
  SMORGASBORD, FOOD 📄 (6) ——— SMORGASBORD, JAPANESE FOOD, CHINESE
                                  FOOD, NUMBER OF KINDS, WESTERN FOOD
  NO SMOKING 📄 (3) ——————————— SMOKING, NO SMOKING, NO SMOKING
                                  AREA, DESIRE FOR NO SMOKING
```

FIG.23C

```
⚡SERVICE 📄 (6) ————————————— RESERVATION, EMPLOYEE, STAFF,
                                  WAITING ON CUSTOMER
⚡CHARGE 📄 (6) ————————————— AMOUNT, CHARGE, PARKING FEE, CHARGE
                                  SETTING
⚡LOCATION 📄 (2) ———————————— IN FRONT OF STATION, VIEW
```

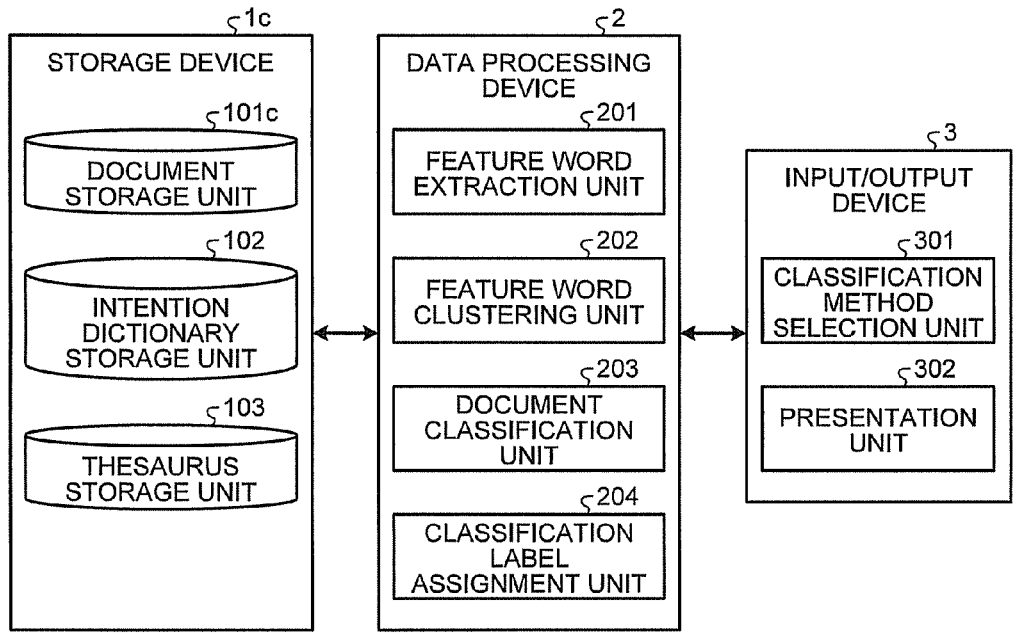

APPARATUS AND METHOD FOR CLASSIFYING DOCUMENT, AND COMPUTER PROGRAM PRODUCT

CROSS-REFERENCE TO RELATED APPLICATION

This application is a continuation of PCT international application Ser. No. PCT/JP2012/066184 filed on Jun. 25, 2012 which designates the United States, the entire contents of which are incorporated herein by reference.

FIELD

Embodiments described herein relate generally to apparatus and method for classifying a document, and a computer program product.

BACKGROUND

As one of document analysis techniques, there is known a reputation analysis that analyzes a reputation of an object, based on intention representation within documents. A reputation analysis determines not only the quality of the object but also the quality for each viewpoint of evaluating the object. Therefore, a conventional reputation analysis requires not only a dictionary of intention representation but also a dictionary of viewpoints subjected to intention representation. Since the former dictionary of intention representation is not dependent on a particular field, it has a general versatility and can be used in various fields. On the other hand, since the latter dictionary of viewpoints is strongly dependent on a particular field, it is lack of a general versatility and thus needs to be separately composed for each field.

On the other hand, as a method for classifying a document set, there is known a document clustering. The document clustering can classify the document set according to contents of individual documents. Therefore, if the classification based on the viewpoint subjected to intention representation can be performed, the reputation analysis can be made without using the dictionary of viewpoints.

Also, there is known technique that uses a thesaurus in the document clustering. For example, there is technique that selects a layer on the thesaurus and classifies and integrates document clusters by using a registered word on the same layer. In this way, the granularity of the classification of the document clusters can be standardized. Also, the registered word of the thesaurus used for classification can be assigned to the classified document cluster as the classification label.

However, in the technique that classifies and integrates the document clusters using the registered word on the same layer of the thesaurus, the registered word in the thesaurus is widely distributed. Therefore, the number of document clusters increases. Also, the classification label is a narrow-sense word belonging to a lower level concept in the thesaurus. Therefore, it is difficult to intelligibly present the document classification result.

Embodiments described herein are directed to provide document classification apparatus, method, and program, which can intelligibly present a document analysis result.

BRIEF DESCRIPTION OF THE DRAWINGS

FIG. 2 is a diagram illustrating an example of a document set stored in a document storage unit;

FIG. 3A is a diagram illustrating an example of an intention representation stored in an intention dictionary storage unit;

FIG. 3B is a diagram illustrating an example of an intention representation stored in an intention dictionary storage unit;

FIG. 4 is a diagram illustrating an example of a thesaurus stored in a thesaurus storage unit;

FIG. 5A is a diagram illustrating an example of feature words extracted from each document to be classified;

FIG. 5B is a diagram illustrating an example of feature words extracted from each document to be classified;

FIG. 7A is a diagram illustrating an example of a classification result of each document to be classified;

FIG. 7B is a diagram illustrating an example of a classification result of each document to be classified;

FIG. 8A is a diagram illustrating an example of a classification label assigned to a document cluster;

FIG. 8B is a diagram illustrating an example of a classification label assigned to a document cluster;

FIG. 9A is a diagram illustrating an example of information presentation by a presentation unit;

FIG. 9B is a diagram illustrating an example of information presentation by a presentation unit;

FIG. 9C is a diagram illustrating an example of information presentation by a presentation unit;

FIG. 12 is a flow chart illustrating a flow of processing by a document classification unit;

FIG. 13 is a flow chart illustrating a flow of processing by a classification label assignment unit;

FIG. 14 is a block diagram illustrating a document classification apparatus of a second embodiment;

FIG. 15 is a diagram illustrating an example of a designated document stored in a designated document storage unit;

FIG. 16 is a diagram illustrating an example of feature words extracted from each document to be classified and a designated document;

FIG. 17 is a diagram illustrating an example of a classification label assigned to a document cluster;

FIG. 18A is a diagram illustrating an example of information presentation by a presentation unit;

FIG. 18B is a diagram illustrating an example of information presentation by a presentation unit;

FIG. 21 is a diagram illustrating an example of feature words extracted from each document to be classified;

FIG. 22 is a diagram illustrating an example of a classification label assigned to a document cluster;

FIG. 23A is a diagram illustrating an example of information presentation by a presentation unit;

FIG. 23B is a diagram illustrating an example of information presentation by a presentation unit;

FIG. 23C is a diagram illustrating an example of information presentation by a presentation unit;

FIG. 24 is a block diagram illustrating a document classification apparatus of a fourth embodiment;

FIG. 25 is a diagram illustrating an example of a document set stored in a document storage unit.

DETAILED DESCRIPTION

According to an embodiment, a document classification apparatus includes a feature word extraction unit, a feature word clustering unit, a document classification unit, a classification label assignment unit, and a presentation unit. The feature word extraction unit is configured to extract feature words from documents included in a document set. The feature word clustering unit is configured to cluster the extracted feature words into a plurality of clusters so that a difference between the number of documents each including any one of the feature words belonging to one cluster and the number of documents each including any one of the feature words belonging to another cluster is equal to or less than a predetermined reference value, the clusters corresponding respectively to subtrees of a thesaurus having a tree structure. The document classification unit is configured to classify the documents included in the document set into the clusters so that each document belongs to the cluster to which the feature word included in the each document belongs. The classification label assignment unit is configured to assign a classification label to each cluster, the classification label being a word representative of the feature words belonging to the each cluster. The presentation unit is configured to present a document classification result in association with the classification label assigned to the corresponding cluster.

Hereinafter, document classification apparatus, method, and program of embodiments will be described with reference to the drawings. Also, although embodiments presented below are an example applied to a document classification apparatus used for reputation analysis, applicable document apparatuses are not limited to this example, and application to various types of document classification apparatuses is possible.

First Embodiment

Figure 1:
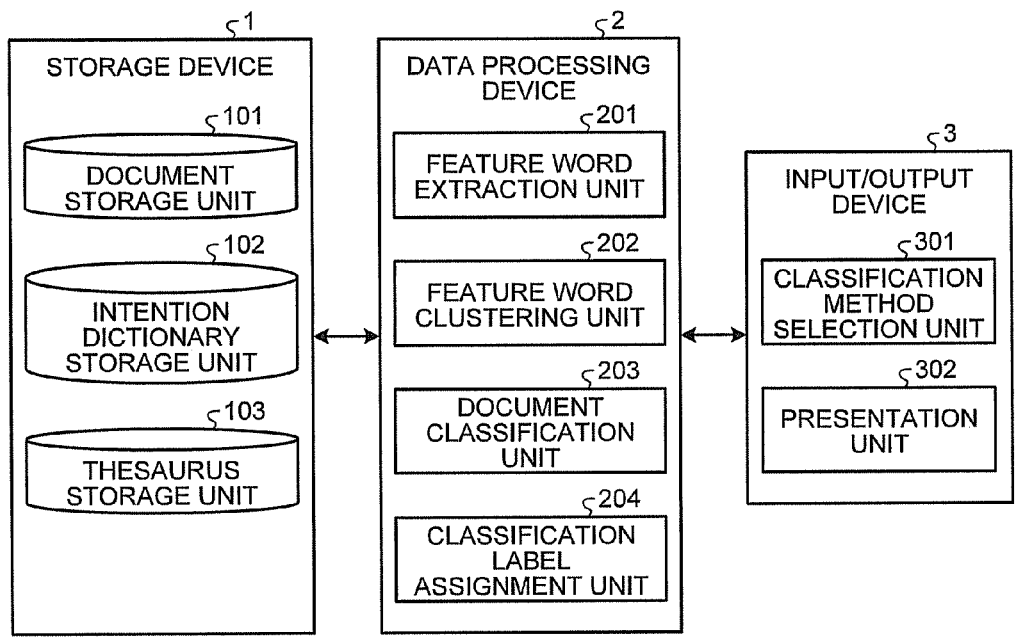
FIG. 1 is a block diagram illustrating a document classification apparatus of a first embodiment.

FIG. 1 is a block diagram illustrating a document classification apparatus of a first embodiment. As illustrated in FIG. 1, the document classification apparatus of the first embodiment includes a storage device 1, a data processing device 2, and an input/output device 3. The storage device 1, the data processing device 2, and the input/output device 3 are connected by wire or wireless such that exchange of information is enabled. Also, the storage device 1, the data processing device 2, and the input/output device 3 may be implemented by a single information processing apparatus.

The storage device 1 includes a document storage unit 101, an intention dictionary storage unit 102, and a thesaurus storage unit 103.

The document storage unit 101 stores a document set to be classified.

FIG. 2 is a diagram illustrating an example of a document set stored in the document storage unit 101. The documents included in the document set are not limited to a particular form and, for example, are documents described in natural language. For example, a document set, including a web page document, a document prepared for business, and a patent gazette, is stored in the document storage unit 101. The document storage unit 101 may store not only the documents themselves but also document IDs in pairs. FIG. 2 illustrates an example in which a document set, including documents from a document whose document ID is D1 to a document whose document ID is D10, is stored in the document storage unit 101.

In the document storage unit 101, for example, a hard disk or flash memory may be used.

The intention dictionary storage unit 102 stores an intension representation that is generally used. The intention representation is a word a person expresses with thought or intention, such as evaluation of event, approval or disapproval, and success or failure.

FIGS. 3A and 3B are diagrams illustrating an example of an intention representation stored in the intention dictionary storage unit 102. The intention dictionary storage unit 102 may store not only the intention representation itself but also types of the intention representation in pairs. FIG. 3A illustrates an example in which the intention representation "nice", "good", "wide", "bad", "regretful", and "high" is stored in the intention dictionary storage unit 102. FIG. 3B illustrates an example in which the intention representation "nice", "good", and "wide" is stored with respect to the type of the intention representation for "favorable evaluation", and the intention representation "bad", "regretful", and "high" is stored with respect to the type of the intention representation for "unfavorable evaluation".

In the intention dictionary storage unit 102, for example, a hard disk or flash memory may be used.

The thesaurus storage unit 103 stores one or more thesauruses. The thesaurus is a dictionary that classifies and systemizes words by an upper level/lower level relationship, a part/entire relationship, a synonymous relationship, or the like with respect to the words. The thesaurus the thesaurus storage unit 103 stores has a tree structure in which an upper level node and a lower level node are linked while setting a registered word as a node.

FIG. 4 is a diagram illustrating an example of the thesaurus stored in the thesaurus storage unit 103. FIG. 4 illustrates an example in which two thesauruses of (a) and (b) are stored in the thesaurus storage unit 103. As the thesauruses the thesaurus storage unit 103 stores, the existing thesauruses may be used. For example, an EDR concept system dictionary, a JST Scientific and Technological Thesaurus, WordNet, or the like may be used. Also, the thesaurus storage unit 103 may store a co-occurrence frequency between the registered words or a co-occurrence degree representing a measure of co-occurrence in pairs as well as the registered words of the thesaurus or a relationship between the registered words. For example, in the co-occurrence degree, Pointwise Mutual Information may be used.

In the thesaurus storage unit 103, for example, a hard disk or flash memory may be used.

The data processing device 2 includes a feature word extraction unit 201, a feature word clustering unit 202, a document classification unit 203, and a classification label assignment unit 204.

The feature word extraction unit 201 extracts feature words from each document to be classified, which is included in the document set stored in the document storage unit 101. Specifically, the feature word extraction unit 201, first, extracts words, which are subjected to the intention representation, from each document to be classified, which is included in the document set, by using the intention representation stored in the intention dictionary storage unit 102. Then, the feature word extraction unit 201 extracts words, which are selected based on a predefined criteria among words subjected to the extracted intention representation, as the feature words.

In the extraction of the words subjected to the intention representation, for example, techniques such as morphological analysis or semantic information extraction, compound word extraction, dependency parsing, and the like may be used. For example, as a specific technique for the compound word extraction, a C-value may be used. Also, a specific type may be selected from the results of the morphological analysis or semantic information extraction, the compound word extraction, and the dependency parsing.

Also, as a method that extracts feature words among the words subjected to the intention representation, for example, a method that extracts words, whose weight calculated based on appearance frequency is equal to or greater than a predetermined value, as the feature words may be used. The predetermined value may be arbitrarily selected according to the number of narrowing feature words, or the like. As the weight based on the appearance frequency, for example, tf-idf may be used. Also, based on the number of the documents included in the document set the document storage unit 101 holds, switching may be performed such that tf-idf is used when the number of the documents is large, and tf (Term Frequency: word appearance frequency) is used when the number of the documents is small.

FIGS. 5A and 5B are diagrams illustrating an example of feature words extracted from each document to be classified, which is included in the document set illustrated in FIG. 2. Also, it is assumed herein that all documents illustrated in FIG. 2 are subjected to classification. FIG. 5A is an example of feature words extracted using the intention representation illustrated in FIG. 3A, and FIG. 5B is an example of feature words extracted using the intention representation illustrated in FIG. 3B.

For example, as illustrated in FIGS. 5A and 5B, the feature words extracted by the feature word extraction unit 201 are held in association with document IDs representing the documents to be extracted. Also, as illustrated in FIG. 5B, the feature words extracted by the feature word extraction unit 201 may also be held in association with the intention representation used for extraction or the type thereof, in addition to the document IDs representing the documents to be extracted. In the example of FIG. 5B, the feature words are further classified using two classes (favorable comment, unfavorable comment) of the type of the intention representation.

The feature word clustering unit 202 clusters the feature words extracted by the feature word extraction unit 201, by using the thesauruses stored in the thesaurus storage unit 103. Specifically, the feature word clustering unit 202 clusters the feature words extracted by the feature word extraction unit 201 into a plurality of feature word clusters, each of which corresponds to a subtree of the thesaurus. The plurality of feature word clusters generated herein is set such that a difference between the number of documents where the feature words belonging to one feature word cluster appear and the number of documents where the feature words belonging to another feature word cluster appear becomes equal to or less than a predefined reference value. That is, between the plurality of feature word clusters, the numbers of the documents where the feature words belonging to the respective feature word clusters appear are made to be close to the same number. Herein, the reference value allowable as the difference of the number of the documents where the feature words belonging to each feature word cluster appear, for example, may be determined based on a ratio with respect to the total number of the documents included in the document set.

As a technique of clustering by the feature word clustering unit 202, for example, a method of hierarchical clustering based on a distance on the thesaurus may be used. Specifically, the following technique may be used: a subtree of the thesaurus grows from a lower level word to an upper level word such that semantically close feature words belong to one feature word cluster, and, when the number of the documents where the feature word belonging to one feature word cluster appears, for example, reaches a predetermined value determined from the ratio with respect to the total number of the documents included in the document set, the growth of the subtree is stopped. In this case, as the distance on the thesaurus between the feature words constituting one feature word cluster, a defined constant is allowed. Also, in a case where one feature word is registered in a plurality of thesauruses, a subtree may be grown across the plurality of thesauruses.

Figure 6:
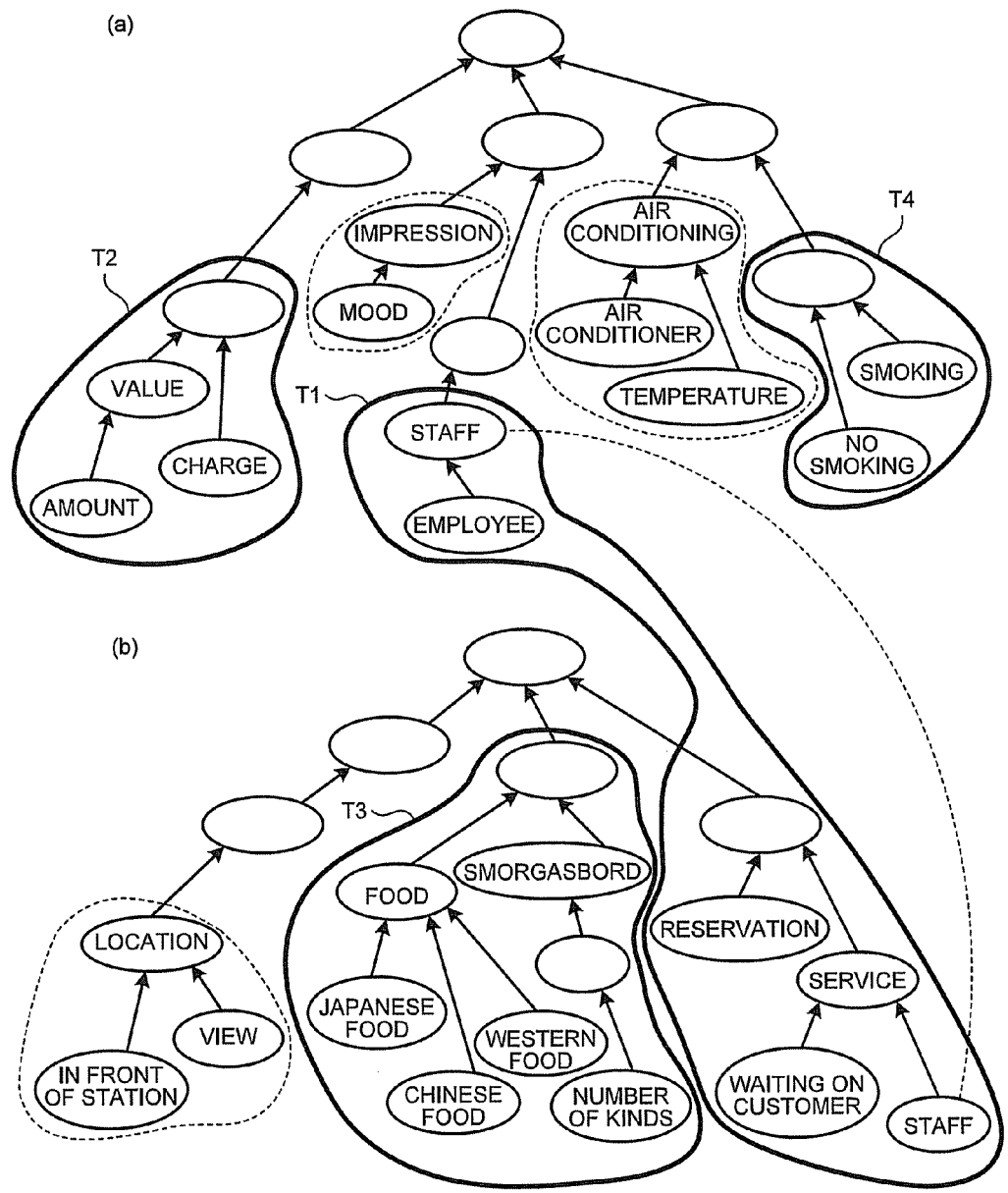
FIG. 6 is a diagram illustrating an example of a clustering result of feature words.

FIG. 6 is a diagram illustrating an example of a result obtained when the feature word clustering unit 202 clusters the feature words. In the example of FIG. 6, feature word clusters corresponding to four subtrees from T1 to T4 are generated, respectively. Respective feature words "reservation", "service", "waiting on customer", "staff", and "employee" belong to the feature word cluster corresponding to the subtree T1. Respective feature words "value", "amount", and "charge" belong to the feature word cluster corresponding to the subtree T2. Respective feature words "food", "Japanese food", "Chinese food", "western food", "smorgasbord", and "number of kinds" belong to the feature word cluster corresponding to the subtree T3. Respective feature words "smoking" and "no smoking" belong to the feature word cluster corresponding to the subtree T4. Also, by considering "staff" of the thesaurus (a) and "staff" of the thesaurus (b) as the same, the subtree T1 is a subtree across two thesauruses (a) and (b).

By using the technique that clusters the feature words to the feature word cluster corresponding to the subtree of the thesaurus as described above, the feature word clustering unit 202 can supplement the words, which could not be extracted as the feature words by the feature word extraction unit 201, as the feature words belonging to the feature word cluster. For example, "food", "Chinese food", "western food", and "smorgasbord" among the feature words belonging to the feature word clusters corresponding to the subtree T3 illustrated in FIG. 6 are words that are not included in the feature word extraction result by the feature word extraction unit 201 illustrated in FIGS. 5A and 5B. However, by growing the subtree of the thesaurus such that "Japanese food" and "number of kinds" extracted as the feature words by the feature word extraction unit 201 belong to one feature word cluster, "food", "Chinese food", "western food", and "smorgasbord" can be supplemented as the feature words belonging to the feature word cluster corresponding to the subtree of the thesaurus.

Also, by using the technique that clusters the feature words to the feature word cluster corresponding to the subtree of the thesaurus as described above, the feature word clustering unit 202 can exclude the words, which are not registered as the registered words of the thesaurus among the words extracted as the feature words by the feature word extraction unit 201, from the feature words belonging to the feature word cluster. For example, in the feature word extraction result by the feature word extraction unit 201 illustrated in FIGS. 5A and 5B, the words "seat", "setting", "parking", and "choice" are included as the feature words, but these words, which are not registered as the registered words of the thesaurus illustrated in FIG. 6, can be excluded from the feature words belonging to the feature word cluster.

As described above, the feature word clustering unit 202 simply clusters a set of feature words extracted by the feature word extraction unit 201 and also has a function of performing clustering while correcting the set of feature words, based on the distance on the thesaurus between the feature words extracted by the feature word extraction unit 201 and the registered words of the thesaurus.

In a case where the feature word clustering unit 202 clusters the feature words as described above, the subtree of the thesaurus does not grow, with regard to the feature words belonging to one feature word cluster and the feature words belonging to another feature word cluster having a large distance on the thesaurus. Therefore, the feature word cluster satisfying the above-described criteria may not correspond to the single subtree. In such a case, the feature word clustering unit 202 gathers a plurality of subtrees, which cannot solely correspond to one feature word cluster satisfying the above-described criteria, and sets the same as one feature word cluster. That is, the feature word cluster becomes a feature word cluster in which feature words being semantically distant (discrete on the thesaurus) are gathered. In the example illustrated in FIG. 6, a subtree set enclosed by dashed lines becomes one feature word cluster. For example, respective feature words "in front of station", "view", "mood", and "temperature" among the feature words exemplified in FIGS. 5A and 5B become feature words belonging to the feature word cluster. Also, even in the feature word cluster, the words "impression" and "air conditioner", which could not be extracted as the feature words by the feature word extraction unit 201, are supplemented as the feature words.

The document classification unit 203 generates a document cluster by classifying each document, which is included in the document set stored in the document storage unit 101, based on the feature word clustering result by the feature word clustering unit 202. Specifically, the document classification unit 203 generates the document cluster with respect to each feature word cluster, which is generated by the feature word clustering unit 202, by classifying the documents, in which the feature words belonging to one feature word cluster appear, into one document cluster. Also, the documents, which do not include the feature words included in the feature word cluster generated by the feature word clustering unit 202, are classified into an unclassified cluster.

FIGS. 7A and 7B are diagrams illustrating an example of a result obtained when each document to be classified, which is included in the document set illustrated in FIG. 2, is classified. Also, it is assumed herein that all documents illustrated in FIG. 2 are subjected to classification. FIGS. 7A and 7B are examples of classification results of the documents that are classified based on the feature word clustering result by the feature word clustering unit 202 illustrated in FIG. 6.

For example, as illustrated in FIGS. 7A and 7B, the classification result by the document classification unit 203 is held in association with document IDs of the documents belonging to each document cluster with respect to each document cluster ID. Also, with respect to each document cluster ID, the classification result may be held as information associated with the feature words belonging to each cluster in addition to the document IDs. FIGS. 7A and 7B illustrate examples in which each document to be classified is classified into five document clusters from a document cluster whose document cluster ID is C1 to a document cluster whose document cluster ID is C5. The document cluster whose document cluster ID is C1 corresponds to the feature word cluster corresponding to the subtree T1 of the thesaurus illustrated in FIG. 6. Also, the document cluster whose document cluster ID is C2 corresponds to the feature word cluster corresponding to the subtree T2 of the thesaurus illustrated in FIG. 6. Also, the document cluster whose document cluster ID is C3 corresponds to the feature word cluster corresponding to the subtree T3 of the thesaurus illustrated in FIG. 6. Also, the document cluster whose document cluster ID is C4 corresponds to the feature word cluster corresponding to the subtree T4 of the thesaurus illustrated in FIG. 6. Also, the document cluster whose document cluster ID is C5 corresponds to the feature word cluster generated by gathering a plurality of subtrees of the thesaurus enclosed by dashed lines illustrated in FIG. 6. As can be seen from the examples illustrated in FIGS. 7A and 7B, one document may be classified into a plurality of document clusters.

The classification label assignment unit 204 assigns classification labels, which are representative of the feature words belonging to each cluster, to the respective document clusters (that is, clusters obtained by clustering the feature words). As the classification labels, for example, one or more of the feature words belonging to each cluster are selected. The selection of the classification labels, for example, may use a selection method based on a range of documents where the feature words appear, a selection method based on a position in the thesaurus of the feature words, or the like. In the case based on the range of the documents where the feature words appear, for example, the classification label is preferentially selected as the appearance frequency of the feature words is higher, or the number of the documents where the feature words appear is larger. Also, in the case based on the position in the thesaurus of the feature words, for example, the classification label is preferentially selected as the concept is a higher level, the word has a larger number of the synonym or different notation, or the feature word is closer to the center of distribution. Also, in a case where the feature words are classified with respect to each type (favorable comment, unfavorable comment, or the like) of the intention representation related to the feature words, the classification label may be selected with respect to each type of the intention representation.

Also, with respect to the document cluster corresponding to the feature word cluster generated by gathering a plurality of subtrees of the thesaurus, the classification label assignment unit 204 assigns a classification label representing that the cluster is a set of a plurality of feature words, which do not constitute one subtree of the thesaurus, that is, a classification label representing that the documents belonging to the document cluster are not semantically classified. As the classification label of this case, for example, "others" or "unclassified" may be used. Also, a representative feature word may be selected and assigned as a classification label, together with "others" and "unclassified".

FIGS. 8A and 8B are diagrams illustrating examples of classification labels assigned by the classification label assignment unit 204. FIG. 8A is an example of classification labels assigned to the respective document clusters of the classification result illustrated in FIG. 7A, and FIG. 8B is an example of classification labels assigned to the respective document clusters of the classification result illustrated in FIG. 7B.

In the examples of FIGS. 8A and 8B, with respect to the document cluster whose document cluster ID is C1, "reservation" and "service" are assigned as the classification labels. Also, with respect to the document cluster whose document cluster ID is C2, "charge" and "value" are assigned as the classification labels. Also, with respect to the document cluster whose document cluster ID is C3, "smorgasbord" and "food" are assigned as the classification labels. Also, with respect to the document cluster whose document cluster ID is C4, "no smoking" is assigned as the classification label. Also, with respect to the document cluster whose document cluster ID is C5, "others", "location", "impression", and "air conditioning" are assigned as the classification labels.

The input/output device 3 includes a classification method selection unit 301 and a presentation unit 302.

The classification method selection unit 301 receives the selection of the document to be classified, among the documents included in the document set stored in the document storage unit 101. The classification method selection unit 301 has a function, for example, a transmission button or the like, which receives the selection of the document to be classified by a user, and explicitly transmits which document has been selected, to the data processing device 2. For example, it is possible to use a method in which, when the user inputs an arbitrary query, a document set corresponding to the input query is selected as a classification target among the documents included in the document set stored in the document storage unit 101, and information specifying the selected document is transmitted to the data processing device 2. When the information from the classification method selection unit 301 is transmitted to the data processing device 2, the feature word extraction unit 201 of the data processing device 2 starts processing. Also, a timing (document classification timing) at which the feature word extraction unit 201 of the data processing device 2 starts processing is not limited to a time point when the information from the classification method selection unit 301 is transmitted. For example, when a new document is stored in the document storage unit 101, the feature word extraction unit 201 of the data processing device 2 may start processing.

The presentation unit 302 presents the document classification result by the document classification unit 203 to the user as information associated with the classification label assigned by the classification label assignment unit 204. Specifically, the presentation unit 302, for example, generates a combination of an icon attached with the number of documents classified into the document cluster and a classification label assigned to the document cluster, as display information, and displays the display information on a display (not illustrated) of the input/output device 3, or the like. Also, the presentation unit 302 may generate display information, which is associated with the feature words belonging to each cluster, to the combination of the icon attached with the number of documents and the classification label, and display the display information on the display of the input/output device 3, or the like. At this time, in a case where the feature words are classified for each type of the intention representation used for the extraction of the features words, it is preferable that the feature word displayed in association with the combination of the icon attached with the number of documents and the classification label be displayed in a distinguishable form for each type of the intention representation.

FIGS. 9A to 9C are diagrams illustrating examples of information presentation by the presentation unit 302. The examples illustrated in FIGS. 9A to 9C are examples that display the display information in which the combination of the icon attached with the number of documents and the classification label is associated with the feature words belonging to each cluster. In the examples illustrated in FIGS. 9A to 9C, the feature words belonging to each cluster are displayed in a distinguishable form for each type of the intention representation used for the extraction of the feature words.

As an example of the distinguishable form for each type of the intention representation, there may be an example that classifies the words or the word backgrounds, writes the words with different fonts, or writes side-by-side the icon representing the type of the intention representation. For example, in the example illustrated in FIG. 9A, the feature words, whose type of the intention representation is the favorable comment, are displayed in a normal font, and the feature words, whose type of the intention representation is the unfavorable comment, are displayed in underlined italics. Also, in the example illustrated in FIG. 9B, the feature words, whose type of the intention representation is the favorable comment, are attached with a smile face icon, and the feature words, whose type of the intention representation is the unfavorable comment, are attached with a troubled face icon. Also, in the example illustrated in FIG. 9C, the feature words belonging to each cluster are separated for each type of the intention representation, the feature words, whose type of the intention representation is the favorable comment, are attached with a smile face icon, and the feature words, whose type of the intention representation is the unfavorable comment, are attached with a troubled face icon. As illustrated in FIG. 9C, the evaluation of the favorable comment and the evaluation of the unfavorable comment may be separately presented.

Next, the operation of the document classification apparatus of the first embodiment will be described with reference to the flow charts of FIGS. 10 to 13. Also, the following description will be given on the assumption that as an initial state, the document set illustrated in FIG. 2 is stored in the document storage unit 101, the intention representation illustrated in FIG. 3B is stored in the intention dictionary storage unit 102, the thesaurus illustrated in FIG. 4 is stored in the thesaurus storage unit 103, and all documents included in the document set illustrated in FIG. 2 are selected as the classification target.

Figure 10:
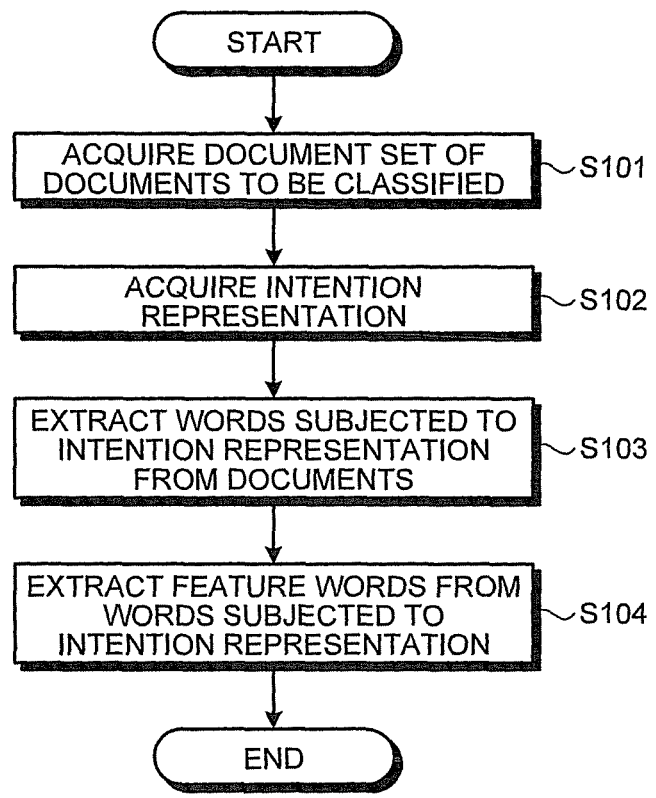
FIG. 10 is a flow chart illustrating a flow of processing by a feature word extraction unit.

FIG. 10 is a flow chart illustrating a flow of processing by the feature word extraction unit 201.

The feature word extraction unit 201, first, acquires the document set stored in the document storage unit 101 (step S101). The document set acquired herein is assumed as the document set illustrated in FIG. 2.

Subsequently, the feature word extraction unit 201 acquires the intention representation stored in the intention dictionary storage unit 102 (step S102). The intention representation acquired herein is assumed as the intention representation illustrated in FIG. 3B.

Subsequently, the feature word extraction unit 201 specifies the intention representation, which is matched with the intention representation stored in the intention dictionary storage unit 102, from each document included in the document set acquired in step S101, and extracts the word subjected to the intention representation (step S103).

Subsequently, the feature word extraction unit 201 extracts words, which are selected based on a predefined criteria among the words extracted in step S103 as the subject of the intention representation, as the feature words (step S104), and ends a series of processing illustrated in the flow chart of FIG. 10.

Figure 11:
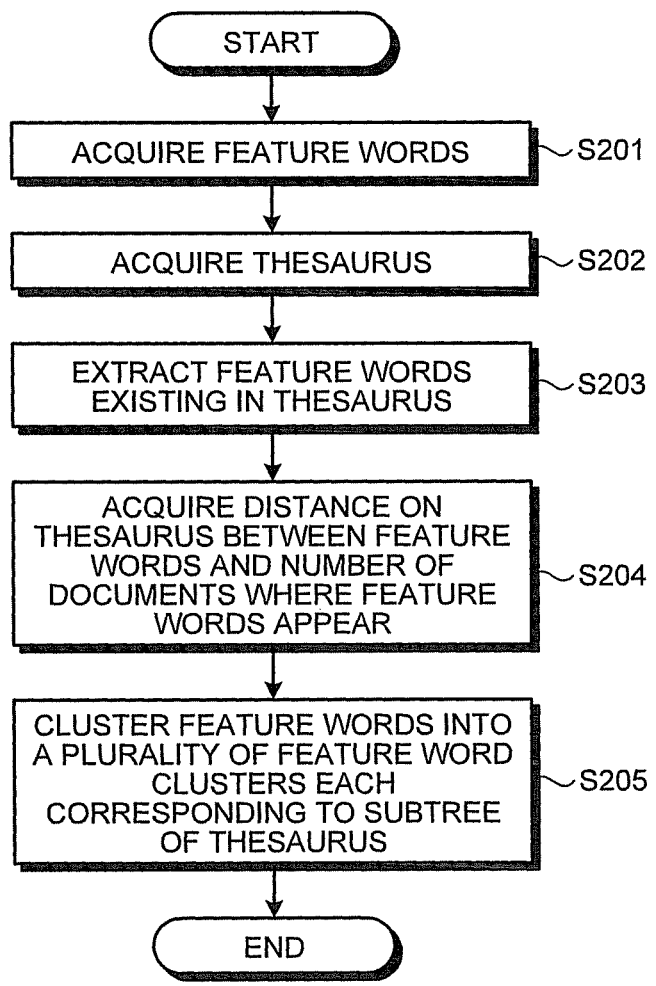
FIG. 11 is a flow chart illustrating a flow of processing by a feature word clustering unit.

FIG. 11 is a flow chart illustrating a flow of processing by the feature word clustering unit 202.

The feature word clustering unit 202, first, acquires the feature words extracted by the feature word extraction unit 201 (step S201). The feature words acquired herein are assumed as the feature words illustrated in FIG. 5B.

Subsequently, the feature word clustering unit 202 acquires the thesaurus stored in the thesaurus storage unit 103 (step S202). The thesaurus acquired herein is assumed as the thesaurus illustrated in FIG. 4.

Subsequently, the feature word clustering unit 202 extracts the feature words existing in the thesaurus acquired in step S202 among the feature words acquired in step S201 (step S203).

Subsequently, the feature word clustering unit 202 acquires the distance on the thesaurus between the feature words acquired in step S203, and the number of documents where the feature words appear (step S204). The distance on the thesaurus between the feature words may use a distance between concepts, which represents a distance between adjacent concepts by unit distance. Also, as the distance on the thesaurus between the feature words, the co-occurrence frequency between the concepts or the co-occurrence degree representing a measure of co-occurrence, which is stored in the thesaurus storage unit 103, may be used.

Subsequently, the feature word clustering unit 202 clusters the feature words, which are extracted in step S203, into a plurality of feature word clusters each corresponding to the subtree of the thesaurus, by using the distance on the thesaurus between the feature words acquired in step S204 and the number of documents where the feature words appear (step S205). At this time, the feature word clustering unit 202 makes the numbers of the documents, in which the feature words belonging to the respective clusters appear, to be close to the same number between the plurality of feature word clusters. That is, the clustering of the feature words is performed such that a difference between the number of documents where the feature words belonging to one feature word cluster appear and the number of documents where the feature words belonging to another feature word cluster appear becomes equal to or less than a predefined reference value. The number of documents where the feature words appear may use the total number of documents where all feature words belonging to the feature word cluster appear, or may use the number of documents where a specific feature word appears among feature words belonging to a specific feature word cluster. Also, a predetermined specific number may be used as the number of documents. Through the feature word clustering by the feature word clustering unit 202, the words registered as the registered words of the thesaurus among the words, which could not be extracted as the feature words by the feature word extraction unit 201, can be supplemented as the feature words belonging to the feature word cluster. The words, which are not registered as the registered words of the thesaurus among the words extracted as the feature words by the feature word extraction unit 201, can be excluded from the feature words belonging to the feature word cluster.

FIG. 12 is a flow chart illustrating a flow of processing by the document classification unit 203.

The document classification unit 203, first, acquires the feature words, which belongs to each feature word cluster generated by the feature word clustering unit 202, as the feature words (step S301).

Subsequently, the document classification unit 203 acquires one document from the document set to be classified, which is stored in the document storage unit 101 (step S302).

Subsequently, the document classification unit 203 determines whether the feature words acquired in step S301 exist in the document to be classified, which is acquired in step S302 (step S303). When the feature words exist in the document to be classified (Yes in step S303), the document classification unit 203 classifies the corresponding document into the feature word cluster to which the feature words belong (step S304). On the other hand, when the feature words do not exist in the document to be classified (No in step S303), the document classification unit 203 classifies the corresponding document into the unclassified cluster (step S305).

Subsequently, the document classification unit 203 determines whether the documents to be classified have been all classified (step S306). When the unclassified document remains (No in step S306), the document classification unit 203 returns to step S302 to repeat the subsequent processing. When the classification of all documents to be classified is completed (Yes in step S306), a series of processing illustrated in the flow chart of FIG. 12 is ended.

FIG. 13 is a flow chart illustrating a flow of processing by the classification label assignment unit 204.

The classification label assignment unit 204, first, acquires the document cluster, which is the document classification result by the document classification unit 203 (step S401).

Subsequently, the classification label assignment unit 204 acquires the subtree of the thesaurus corresponding to each document cluster acquired in step S401 (step S402).

Subsequently, the classification label assignment unit 204 selects a word, which is representative of the feature words belonging to each document cluster, by using a subtree structure of the thesaurus corresponding to each document cluster (step S403). Also, in a case where the feature words belonging to each document cluster are classified with respect to each type of the intention representation, a word which is representative of the feature words may be selected with respect to each type of the intention representation.

Subsequently, the classification label assignment unit 204 assigns the word selected in step S403 to each document cluster as the classification label (step S404), and ends a series of processing illustrated in the flow chart of FIG. 13.

As described above in detail with the specific examples, according to the document classification apparatus of the first embodiment, the feature words extracted from the documents to be classified are clustered into a plurality of feature word clusters, each of which corresponds to the subtree of the thesaurus and in which the numbers of documents where the feature words belonging to each cluster appear become almost equal. The document clusters are generated by classifying the documents to be classified, based on the feature word clusters, the classification labels are assigned to the respective document clusters, and the document classification result is presented to the user in association with the classification labels. Therefore, since it is possible to prevent the harmful effect that the number of the classified clusters is increased too much and the number of documents classified for each cluster is greatly biased, the document classification result can be intelligibly presented to the user.

Also, according to the document classification apparatus of the first embodiment, the words selected from the words subjected to the intention representation are extracted as the feature words, and the feature words are clustered using the thesaurus. Therefore, the reputation analysis can be performed, without using the viewpoint dictionary strongly dependent on a specific field.

Also, according to the document classification apparatus of the first embodiment, the document classification result is presented to the user in association with the classification labels and the feature words. Therefore, the document classification result can be more intelligibly presented to the user. Also, by presenting the feature words in a distinguishable form for each type of the intention representation, the document classification result can be more intelligibly presented.

Second Embodiment

FIG. 14 is a block diagram illustrating a document classification apparatus of a second embodiment. Also, the same reference numerals are assigned to the configuration common to the first embodiment. As illustrated in FIG. 14, the document classification apparatus of the second embodiment includes a storage device 1a, a data processing device 2a, and an input/output device 3a. The storage device 1a, the data processing device 2a, and the input/output device 3a are connected by wire or wireless such that exchange of information is enabled. Also, the storage device 1a, the data processing device 2a, and the input/output device 3a may be implemented by a single information processing apparatus.

The storage device 1a includes a designated document storage unit 104, in addition to a document storage unit 101, an intention dictionary storage unit 102, and a thesaurus storage unit 103.

The designated document storage unit 104 stores documents other than documents to be classified, for example, documents including background knowledge for classifying documents. The documents stored in the designated document storage unit 104 are documents designated when the documents to be classified are classified. Hereinafter, the documents stored in the designated document storage unit 104 will be referred to as designated documents.

FIG. 15 is a diagram illustrating an example of the designated documents stored in the designated document storage unit 104. The designated documents are not limited to a particular form and, for example, are documents described in natural language. For example, a news release, a newspaper article, a technical documentation, and the like are stored in the designated document storage unit 104 as the designated documents. The designated document storage unit 104 may store not only the designated documents themselves but also designated document IDs in pairs. FIG. 15 illustrates an example in which a designated document whose designated document ID is N1 and a designated document whose designated document ID is N2 are stored in the designated document storage unit 104.

In the designated document storage unit 104, for example, a hard disk or flash memory may be used.

The data processing device 2a includes a feature word extraction unit 201a, a feature word clustering unit 202a, a document classification unit 203a, and a classification label assignment unit 204a.

As in the feature word extraction unit 201 of the first embodiment, the feature word extraction unit 201a extracts words, which are selected among words subjected to intention representation, as the feature words. However, the feature word extraction unit 201a also extracts the words included in the designated documents stored by the designated document storage unit 104, as the feature words, in addition to the words selected among the words subjected to the intention representation. That is, the feature word extraction unit 201a extracts the words, which are included in the designated documents among the words included in the documents to be classified, as the feature words.

FIG. 16 is a diagram illustrating an example of the feature words extracted from the respective documents to be classified, which are included in the document set illustrated in FIG. 2, and the designated documents illustrated in FIG. 15. Also, it is assumed herein that all documents illustrated in FIG. 2 are subjected to classification.

For example, as illustrated in FIG. 16, the feature words extracted by the feature word extraction unit 201a are held in association with document IDs representing the documents to be extracted. Also, the feature words extracted as the words included in the designated documents may be held in association with information representing the words included in the designated documents. In the example illustrated in FIG. 16, it is shown that "Pirates Dining" and "no smoking area" among the feature words extracted from the document, whose document ID is D1, are extracted as the words included in the designated documents. Also, it is shown that "Pirates Dining" among the feature words extracted from the document, whose document ID is D3, is extracted as the word included in the designated document. Also, it is shown that "Tropical Buffet" among the feature words extracted from the document, whose document ID is D5, is extracted as the word included in the designated document. Also, it is shown that "Pirates Dining" among the feature words extracted from the document, whose document ID is D6, is extracted as the word included in the designated document. Also, it is shown that "Pirates Dining" among the feature words extracted from the document, whose document ID is D8, is extracted as the word included in the designated document.

As in the feature word clustering unit 202 of the first embodiment, the feature word clustering unit 202a clusters the feature words extracted from the document to be classified. However, the feature word clustering unit 202a clusters the feature words, which are extracted as the words included in the designated documents, into one cluster. In the example illustrated in FIG. 16, "Pirates Dining" and "Tropical Buffet", which are the feature words extracted as the words included in the designated documents, are clustered into one cluster, respectively. Also, even when the feature words are extracted as the words included in the designated documents, those matched with the feature words extracted from only the documents to be classified, like "no smoking area", are clustered in the method described in the first embodiment.

As in the document classification unit 203 of the first embodiment, the document classification unit 203a classifies the documents to be classified, based on the feature word clusters that are the clustering result by the feature word clustering unit 202a. However, in a case where the feature words extracted from the designated documents appear in the documents to be classified, the documents are classified into the cluster to which the feature words extracted from the designated documents belong. In the example illustrated in FIG. 16, the document whose document ID is D1, the document whose document ID is D3, the document whose document ID is D6, and the document whose document ID is D8 are classified into the clusters to which "Pirates Dining" belongs, respectively. Also, the document whose document ID is D5 is classified into the cluster to which "Tropical Buffet" belongs.

As in the classification label assignment unit 204 of the first embodiment, with respect to the document cluster, which is the cluster with the classified document, the classification label assignment unit 204a assigns the word representative of the feature words belonging to the cluster as the classification label. However, with respect to the cluster to which the feature words extracted from the designated documents belong, the classification label assignment unit 204*a* assigns the feature words themselves extracted from the designated documents as the classification label.

FIG. 17 is a diagram illustrating an example of classification labels assigned by the classification label assignment unit 204*a*. In the example of FIG. 17, with respect to the cluster (cluster whose document cluster ID is C6) to which the feature word "Pirates Dining" extracted from the designated document belongs, "Pirates Dining" itself is assigned as the classification label, and with respect to the cluster (cluster whose document cluster ID is C7) to which the feature word "Tropical Buffet" extracted from the designated document belongs, "Tropical Buffet" itself is assigned as the classification label.

The input/output device 3*a* includes a classification method selection unit 301*a* and a presentation unit 302*a*.

As in the classification method selection unit 301 of the first embodiment, the classification method selection unit 301*a* receives the selection of the document to be classified. However, the classification method selection unit 301*a* also receives the designation of the designated document used for document classification, in addition to the selection of the document to be classified. The classification method selection unit 301*a* has a function, for example, a transmission button or the like, which receives the selection of the document to be classified and the designation of the designated document by a user, and explicitly transmits which document has been selected as the classification target and which designated document has been designated, to the data processing device 2*a*. For example, it is possible to use a method in which, when the user inputs an arbitrary query, a document set corresponding to the input query is selected as a classification target among the documents included in the document set stored in the document storage unit 101, a designated document corresponding to the input query is selected among the designated documents stored in the designated document storage unit 104, and information specifying the document selected as the classification target or the designated document is transmitted to the data processing device 2*a*. When the information from the classification method selection unit 301*a* is transmitted to the data processing device 2*a*, the feature word extraction unit 201*a* of the data processing device 2*a* starts processing.

As in the presentation unit 302 of the first embodiment, the presentation unit 302*a* presents the document classification result by the document classification unit 203*a* to the user as information associated with the classification label assigned by the classification label assignment unit 204*a*. However, with respect to the cluster to which the feature word extracted from the designated document belongs, the presentation unit 302*a* performs presentation in a form capable of determining that the cluster is a cluster to which the feature word extracted from the designated document belongs. As an example that performs presentation in a form capable of determining that the cluster is a cluster to which the feature word extracted from the designated document belongs, there may be an example that a classification label and a predetermined icon are written side by side.

FIGS. 18A and 18B are diagrams illustrating examples of information presentation by the presentation unit 302*a*. The examples illustrated in FIGS. 18A and 18B are examples that display the display information in which the combination of the icon attached with the number of documents and the classification label is associated with the feature words belonging to each cluster. Compared with the example of the information presentation by the presentation unit 302 of the first embodiment illustrated in FIG. 9A, with respect to each classification label of "no smoking", "Pirates Dining", and "Tropical Buffet", a flag icon representing that the cluster to which these classification labels are assigned is the cluster to which the feature words extracted from the designated document belong is written side by side. Also, the example illustrated in FIG. 18B is an example in which the arranging order of the analysis result is changed such that the classification label to which the flag icon is written side by side is arranged at an upper level. As in the example illustrated in FIG. 18B, the information of the classification result may be presented in such a form that the cluster to which the feature word extracted from the designated document belongs is moved up.

As described above in detail with the specific examples, according to the document classification apparatus of the second embodiment, the feature words are extracted from the designated documents as well as the documents to be classified, and the feature words extracted from the designated documents are clustered into one cluster. With respect to the cluster to which the feature word extracted from the designated document belongs, the feature word itself extracted from the designated document is assigned as the classification label, and the document classification result is presented in a form capable of determining that the cluster to which the classification label is assigned is the cluster to which the feature word extracted from the designated document belongs. Therefore, the document classification can be performed in such a form that the user's intention is reflected, and the document classification result can be intelligibly presented to the user.

Third Embodiment

Figures 19, 20:
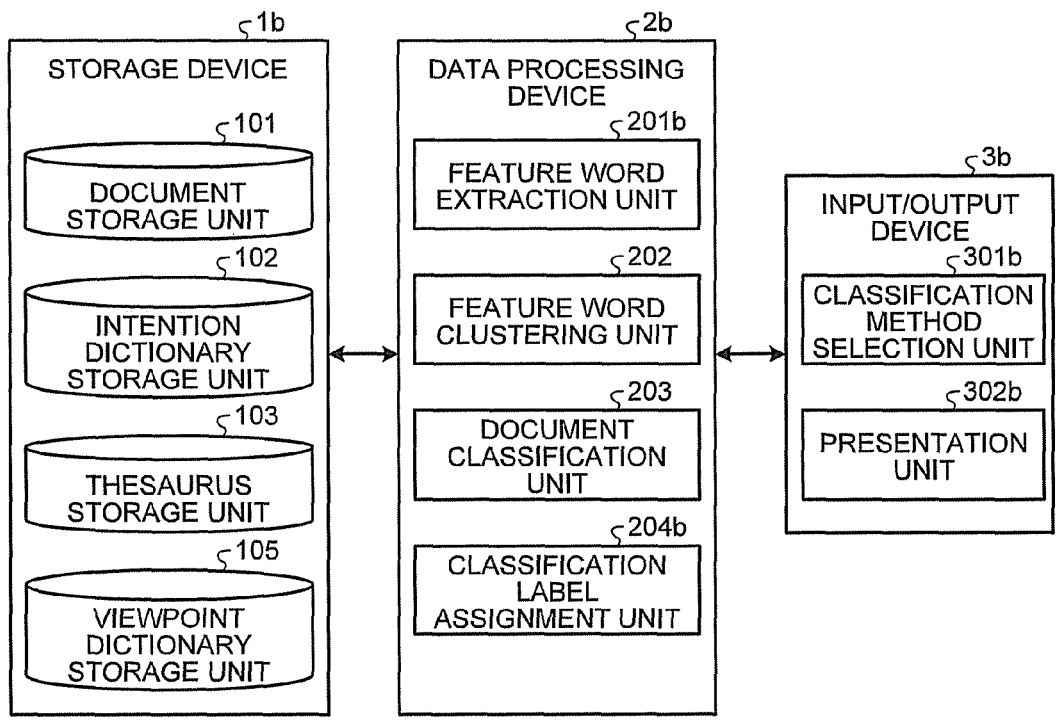
FIG. 19 is a block diagram illustrating a document classification apparatus of a third embodiment.
FIG. 20 is a diagram illustrating an example of a viewpoint dictionary stored in a viewpoint dictionary storage unit.

FIG. 19 is a block diagram illustrating a document classification apparatus of a third embodiment. Also, the same reference numerals are assigned to the configuration common to the first embodiment. As illustrated in FIG. 19, the document classification apparatus of the third embodiment includes a storage device 1*b*, a data processing device 2*b*, and an input/output device 3*b*. The storage device 1*b*, the data processing device 2*b*, and the input/output device 3*b* are connected by wire or wireless such that exchange of information is enabled. Also, the storage device 1*b*, the data processing device 2*b*, and the input/output device 3*b* may be implemented by a single information processing apparatus.

The storage device 1*b* includes a viewpoint dictionary storage unit 105, in addition to a document storage unit 101, an intention dictionary storage unit 102, and a thesaurus storage unit 103.

The viewpoint dictionary storage unit 105 stores a dictionary of viewpoints subjected to intention representation. The dictionary of viewpoints describes viewpoint representation for document classification. The viewpoint representation is a representation representing the viewpoint of the document analysis.

FIG. 20 is a diagram illustrating an example of a viewpoint dictionary stored in the viewpoint dictionary storage unit 105. The viewpoint dictionary storage unit 105 may store a viewpoint dictionary in which types of the intention representation as well as the intention representation itself are paired. FIG. 20 illustrates an example in which the viewpoint representation of "charge", "value", and "price" for the type of the viewpoint representation of "charge", the viewpoint representation of "service", "employee", and "waiting on customer" for the type of the viewpoint representation of "service", and the viewpoint representation of "location", "in front of station", and "near station" for the type of the viewpoint representation of "location" are stored in the viewpoint dictionary storage unit 105 as the viewpoint dictionary.

In the viewpoint dictionary storage unit 105, for example, a hard disk or flash memory may be used.

The data processing device 2b includes a feature word extraction unit 201b instead of the feature word extraction unit 201 of the first embodiment, and includes a classification label assignment unit 204b instead of the classification label assignment unit 204 of the first embodiment.

As in the feature word extraction unit 201 of the first embodiment, the feature word extraction unit 201b extracts words, which are selected among words subjected to intention representation, as feature words. However, the feature word extraction unit 201b preferentially extracts the viewpoint representation, which is included in the viewpoint dictionary stored in the viewpoint dictionary storage unit 105 among the words subjected to the intention representation, as the feature word.

FIG. 21 is a diagram illustrating an example of feature words extracted from each document to be classified, which is included in the document set illustrated in FIG. 2, by using the viewpoint representation illustrated in FIG. 20. Also, all documents illustrated in FIG. 2 are subjected to classification, and the documents are classified using all viewpoint representations illustrated in FIG. 20.

For example, as illustrated in FIG. 21, the feature words extracted by the feature word extraction unit 201b are held in association with document IDs representing the documents to be extracted. Also, the feature words matched with the viewpoint representation included in the viewpoint dictionary the viewpoint dictionary storage unit 105 stores are held in association with the type of the viewpoint representation. In the example illustrated in FIG. 21, it is shown that "waiting on customer" included in the type of "service" among the feature words extracted from the document whose document ID is D1 is the feature word matched with the viewpoint representation included in the viewpoint dictionary the viewpoint dictionary storage unit 105 stores. Also, it is shown that "employee" and "waiting on customer" included in the type of "service" among the feature words extracted from the document whose document ID is D2 is the feature word matched with the viewpoint representation included in the viewpoint dictionary the viewpoint dictionary storage unit 105 stores. Also, it is shown that "charge" included in the type of "charge" and "in front of station" included in the type of "location" among the feature words extracted from the document whose document ID is D6 are the feature words matched with the viewpoint representation included in the viewpoint dictionary the viewpoint dictionary storage unit 105 stores. Also, it is shown that "charge" included in the type of "charge" among the feature words extracted from the document whose document ID is D7 or the document whose document ID is D8 is the feature word matched with the viewpoint representation included in the viewpoint dictionary the viewpoint dictionary storage unit 105 stores.

As in the classification label assignment unit 204 of the first embodiment, with respect to the document cluster, which is the cluster with the classified document, the classification label assignment unit 204b assigns the word representative of the feature words belonging to the cluster as the classification label. However, with respect to the cluster to which the feature word matched with the viewpoint representation included in the viewpoint dictionary the viewpoint dictionary storage unit 105 stores belongs, the classification label assignment unit 204b preferentially selects the word representing the type of the viewpoint representation as the classification label.

FIG. 22 is a diagram illustrating an example of classification labels assigned by the classification label assignment unit 204b. In the example of FIG. 22, with respect to the cluster (cluster whose document cluster ID is C1) to which "waiting on customer" or "employee" being the viewpoint representation included in the viewpoint dictionary stored by the viewpoint dictionary storage unit 105 belongs, the word "service" representing the type of the "waiting on customer" or "employee" is assigned as the classification label. Also, with respect to the cluster (cluster whose document cluster ID is C2) to which "charge" being the viewpoint representation included in the viewpoint dictionary stored by the viewpoint dictionary storage unit 105 belongs, the word "charge" representing the type of the "charge" is assigned as the classification label. Also, with respect to the cluster (cluster whose document cluster ID is C5) to which "in front of station" being the viewpoint representation included in the viewpoint dictionary stored by the viewpoint dictionary storage unit 105 belongs, the word "location" representing the type of the "in front of station" is assigned as the classification label.

The input/output device 3b includes a classification method selection unit 301b and a presentation unit 302b.

As in the classification method selection unit 301 of the first embodiment, the classification method selection unit 301b receives the selection of the document to be classified. However, the classification method selection unit 301b also receives the selection of the type of the viewpoint representation used for document classification among the types of the viewpoint representations held by the viewpoint dictionary storage unit 105, in addition to the selection of the document to be classified. The classification method selection unit 301b has a function, for example, a transmission button or the like, which receives the selection of the document to be classified and the selection of the type of the viewpoint representation by a user, and explicitly transmits which document has been selected as the classification target and which type has been designated as the type of the viewpoint representation used for the document classification, to the data processing device 2b. For example, it is possible to use a method in which, when the user inputs an arbitrary query, a document set corresponding to the input query is selected as a classification target among the documents included in the document set stored in the document storage unit 101, the type of the viewpoint representation corresponding to the input query is selected among the types of the viewpoint representation held by the viewpoint dictionary storage unit 105, and information specifying the document selected as the classification target or the type of the viewpoint representation used for the document classification to the data processing device 2b. When the information from the classification method selection unit 301b is transmitted to the data processing device 2b, the feature word extraction unit 201b of the data processing device 2b starts processing.

As in the presentation unit 302 of the first embodiment, the presentation unit 302b presents the document classification result by the document classification unit 203 to the user as information associated with the classification label assigned by the classification label assignment unit 204b. However, with respect to the cluster to which the feature word matched with the viewpoint representation included in the viewpoint dictionary stored by the viewpoint dictionary storage unit 105 belongs, the presentation unit 302b performs presentation in a form capable of determining that the cluster is a cluster to which the feature word matched with the viewpoint representation included in the viewpoint dictionary stored by the viewpoint dictionary storage unit 105 belongs. As an example that performs presentation in a form capable of determining that the cluster is a cluster to which the feature word matched with the viewpoint representation included in the viewpoint dictionary stored by the viewpoint dictionary storage unit 105 belongs, there may be an example that a classification label and a predetermined icon are written side by side.

FIGS. 23A to 23C are diagrams illustrating examples of information presentation by the presentation unit 302b. The examples illustrated in FIGS. 23A to 23C are examples that display the display information in which the combination of the icon attached with the number of documents and the classification label is associated with the feature words belonging to each cluster. Compared with the example of the information presentation by the presentation unit 302 of the first embodiment illustrated in FIG. 9A, with respect to each classification label of "reservation, service", "charge, value", and "others, location, impression, air conditioning", a glasses icon representing that the cluster to which these classification labels are assigned is the cluster to which the feature words matched with the viewpoint representation included in the viewpoint dictionary stored by the viewpoint dictionary storage unit 105 belong is written side by side. Also, the example illustrated in FIG. 23B is an example in which the arranging order of the analysis result is changed such that the classification label to which the glass icon is written side by side is arranged at an upper level. As in the example illustrated in FIG. 23B, the information of the classification result may be presented in such a form that the cluster to which the feature word matched with the viewpoint representation included in the viewpoint dictionary stored by the viewpoint dictionary storage unit 105 belongs is moved up. Also, the example illustrated in FIG. 23C is an example of presentation illustrating only the cluster to which the feature word matched with the viewpoint representation included in the viewpoint dictionary stored by the viewpoint dictionary storage unit 105 belongs. In a case where the feature word extraction unit 201b extracts only the feature word matched with the viewpoint representation included in the viewpoint dictionary stored by the viewpoint dictionary storage unit 105, the information of the classification result is presented as in the example illustrated in FIG. 23C.

As described above in detail with the specific examples, according to the document classification apparatus of the third embodiment, the word matched with the viewpoint representation included in the viewpoint dictionary stored by the viewpoint dictionary storage unit 105 among the words subjected to the intention representation included in the document to be classified is preferentially extracted as the feature word. With respect to the cluster to which the feature word matched with the viewpoint representation included in the viewpoint dictionary stored by the viewpoint dictionary storage unit 105 belongs, the word representing the type of the viewpoint representation is assigned as the classification label, and the document classification result is presented in a form capable of determining that the cluster to which the classification label is assigned is the cluster to which the feature word matched with the viewpoint representation included in the viewpoint dictionary stored by the viewpoint dictionary storage unit 105 belongs. Therefore, the document classification can be performed in such a form that the user's intention is reflected, and the document classification result can be intelligibly presented to the user.

Fourth Embodiment

FIG. 24 is a block diagram illustrating a document classification apparatus of a fourth embodiment. Also, the same reference numerals are assigned to the configuration common to the first embodiment. As illustrated in FIG. 24, the document classification apparatus of the fourth embodiment includes a storage device 1c, a data processing device 2, and an input/output device 3. The data processing device 2 and the input/output device 3 are the same as those of the first embodiment. The storage device 1c, the data processing device 2, and the input/output device 3 are connected by wire or wireless such that exchange of information is enabled. Also, the storage device 1c, the data processing device 2, and the input/output device 3 may be implemented by a single information processing apparatus.

The storage device 1c includes a document storage unit 101c instead of the document storage unit 101 of the first embodiment.

The document storage unit 101c stores the document set of structured documents, which are separated into document elements for each intention representation, as the document set subjected to classification.

FIG. 25 is a diagram illustrating an example of a document set stored in the document storage unit 101c. The structured documents included in the document set, for example, a web page document, a document prepared for business, and a patent gazette, are stored in a form of separated document elements for each intention representation. The document storage unit 101c may store not only the structured documents themselves but also document IDs in pair.

FIG. 25 illustrates an example in which a document set, including documents from a structured document whose document ID is D1 to a structured document whose document ID is D3, is stored in the document storage unit 101c. The structured document whose document ID is D1 has document elements for each intention representation of "wide", "untaken", and "good". Also, the structured document whose document ID is D2 has document elements for each intention representation of "smile face", "good", "delicious", "conscientious", and "frustrating". Also, the structured document whose document ID is D3 has document elements corresponding to the intention representation of "many".

In the document storage unit 101c, for example, a hard disk or flash memory may be used.

As in the first embodiment, the feature word extraction unit 201 of the data processing device 1 in the document classification apparatus of the fourth embodiment extracts the word subjected to intention representation from each document to be classified, which is included in the document set, and extracts the word, which is selected based on a predefined criteria among words subjected to the extracted intention representation, as the feature word. In this case, in the fourth embodiment, since the document to be classified is the structured document separated into document elements for each intention representation, the feature word extraction unit 201 extracts the feature words from the document elements of each document, which simplifies the processing.

As described above, according to the document classification apparatus of the fourth embodiment, the document to be classified is stored in the document storage unit 101c as the structured document. Therefore, in addition to the effect of the first embodiment, the document classification can be efficiently performed by simply performing the processing of extracting the feature words from the document to be classified.

Figure 26:
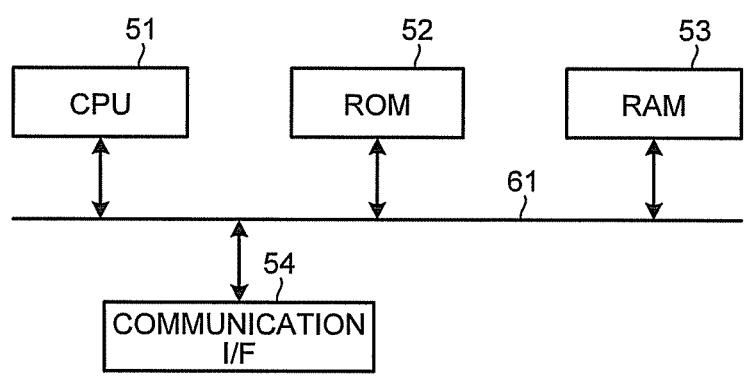
FIG. 26 is an illustrative diagram illustrating an example of a hardware configuration of a data processing device.

In each of the above-described embodiments, each of the above-described functions of the data processing devices 2, 2a and 2b, for example, may be implemented in a way that the data processing devices 2, 2a and 2b execute a predetermined program. The hardware configuration of the data processing devices 2, 2a and 2b at this time will be described with reference to FIG. 26. FIG. 26 is an illustrative diagram illustrating an example of the hardware configuration of the data processing devices 2, 2a and 2b.

The data processing devices 2, 2a and 2b includes a control device such as a Central Processing Unit (CPU) 51, a storage device such as a Read Only Memory (ROM) 52 or a Random Access Memory (RAM) 53, a communication I/F 54 connected to a network to perform communication, an external storage device such as a Hard Disk Drive (HDD) or a Compact Disc (CD), a display device such as a display apparatus, an input device such as a keyboard or a mouse, and a bus 61 connecting the respective units, which is a hardware configuration using a typical computer.

Programs executed in the data processing devices 2, 2a and 2b having the above-described hardware configuration are recorded in a computer-readable recording medium, such as a Compact Disk Read Only Memory (CD-ROM), a flexible disk (FD), a Compact Disk Recordable (CD-R), or a Digital Versatile Disk (DVD), in a file of an installable format or an executable format, and are provided as computer program products.

Also, the programs executed in the data processing devices 2, 2a and 2b may be stored on a computer connected to a network such as the Internet and be provided by download via the network. Also, the programs executed in the data processing devices 2, 2a and 2b may be provided or distributed via the network such as the Internet.

Also, the programs executed in the data processing devices 2, 2a and 2b may be provided while being embedded into the ROM 52 of the data processing devices 2, 2a and 2b, or the like.

The programs executed in the data processing devices 2, 2a and 2b is configured by a module including the respective units, of the data processing devices 2, 2a and 2b (the feature word extraction unit 201 (201a, 201b), the feature word clustering unit 202 (202a), the document classification unit 203 (203a), the classification label assignment unit 204 (204a, 204b), and the like). As the actual hardware, for example, the CPU 51 (processor) reads the programs from the storage medium and executes the read programs. Therefore, the respective units are loaded on the main storage device, so that the above-described units are generated on the main storage device.

Therefore, according to at least one embodiment described above, since it is possible to prevent the harmful effect that the number of the classified clusters is increased too much and the number of documents classified for each cluster is greatly biased, the document classification result can be intelligibly presented to the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document classification apparatus comprising:
a storage device that stores at least one or more thesauruses; and
a processor that performs operations, comprising:
extracting feature words from documents included in a document set;
clustering the extracted feature words into a plurality of clusters by using the one or more thesauruses stored in the storage device so that a difference between the number of documents each including any one of the feature words belonging to one cluster and the number of documents each including any one of the feature words belonging to another cluster is equal to or less than a predetermined reference value, the clusters corresponding respectively to subtrees of the thesaurus having a tree structure;
classifying the documents included in the document set into the clusters so that each document belongs to the cluster to which the feature word included in the each document belongs;
assigning a classification label to each cluster, the classification label being a word representative of the feature words belonging to the each cluster; and
presenting a document classification result in association with the classification label assigned to the corresponding cluster, wherein
the clustering of the extracted feature words further comprises clustering a plurality of feature words which do not each correspond to any subtree in the thesaurus, into one cluster, and
the assigning of the classification label comprises assigning a classification label representing that the cluster is a set of the feature words not corresponding to any subtree of the thesaurus, to the cluster to which the feature words that do not each correspond to any subtree in the thesaurus belongs.

2. The apparatus according to claim 1, wherein the extracting of the feature words comprises extracting words subjected to intention representation by using more than one type of intention representation and selecting words from the extracted words based on a predefined criteria, as the feature words.

3. The apparatus according to claim 2, wherein the selecting of the words comprises selecting words, each word having a weight calculated based on appearance frequency that is equal to or greater than a predetermined value as the feature words.

4. The apparatus according to claim 2, wherein the presenting of the document classification result comprises presenting the document classification result in association with the classification label assigned to the corresponding cluster and the feature words belonging to the corresponding cluster.

5. The apparatus according to claim 4, wherein the presenting of the document classification result comprises presenting each of the feature words that is to be presented in association with the document classification result, in a distinguishable form for each type of intention representation used for the extracting of the feature words.

6. The apparatus according to claim 1, wherein the extracting of the feature words further comprises extracting one or more feature words from a designated document that is other than the documents included in the document set, the clustering of the extracted feature words further comprises, when the one or more feature words are extracted from the designated document, clustering the one or more feature words extracted from the designated document into one cluster, and the classifying of the documents further comprises, when a document included in the document set includes the one or more feature words extracted from the designated document, classifying the document into the cluster to which the one or more feature words extracted from the designated document belong.

7. The apparatus according to claim 2, wherein the storage device further stores a dictionary for view point subject to intention representation, and the selecting of words comprises selecting words that are included in the dictionary for viewpoint among words subjected to intention representation, as the feature word.

8. The apparatus according to claim 2, wherein each of the documents included in the document set is a structured document that is separated into document elements each of which corresponds to one of intention representations, and the extracting of the feature words comprises extracting the feature word from the document elements.

9. A document classification method comprising:

extracting feature words from documents included in a document set;

clustering the extracted feature words into a plurality of clusters by using a thesaurus stored in a storage device so that a difference between the number of documents each including any one of the feature words belonging to one cluster and the number of documents each including any one of the feature words belonging to another cluster is equal to or less than a predetermined reference value, the clusters corresponding respectively to subtrees of the thesaurus having a tree structure;

classifying the documents included in the document set into the clusters so that each document belongs to the cluster to which the feature word included in the each document belongs;

assigning a classification label to each cluster, the classification label being a word representative of the feature words belonging to the each cluster; and presenting a document classification result in association with the classification label assigned to the corresponding cluster, wherein the clustering of the extracted feature words further comprises clustering a plurality of feature words which do not each correspond to any subtree in the thesaurus, into one cluster, and the assigning of the classification label comprises assigning a classification label representing that the cluster is a set of the feature words not corresponding to any subtree in the thesaurus, to the cluster to which the feature words that do not each correspond to any subtree in the thesaurus belongs.

10. A computer program product comprising a non-transitory computer-readable medium containing a program executed by a computer, the program causing the computer to execute:

extracting feature words from documents included in a document set;

clustering the extracted feature words into a plurality of clusters by using a thesaurus stored in a storage device so that a difference between the number of documents each including any one of the feature words belonging to one cluster and the number of documents each including any one of the feature words belonging to another cluster is equal to or less than a predetermined reference value, the clusters corresponding respectively to subtrees of the thesaurus having a tree structure;

classifying the documents included in the document set into the clusters so that each document belongs to the cluster to which the feature word included in the each document belongs;

assigning a classification label to each cluster, the classification label being a word representative of the feature words belonging to the each cluster; and presenting a document classification result in association with the classification label assigned to the corresponding cluster, wherein the clustering of the extracted feature words further comprises clustering a plurality of feature words which do not each correspond to any subtree in the thesaurus, into one cluster, and the assigning of the classification label comprises assigning a classification label representing that the cluster is a set of the feature words not corresponding to any subtree of the thesaurus, to the cluster to which the feature words that do not each correspond to any subtree in the thesaurus belongs.

* * * * *